(12) United States Patent
Tanaka et al.

(10) Patent No.: US 8,135,213 B2
(45) Date of Patent: Mar. 13, 2012

(54) PHYSICAL QUANTITY INTERPOLATING METHOD, AND COLOR SIGNAL PROCESSING CIRCUIT AND CAMERA SYSTEM USING THE SAME

(75) Inventors: Futabako Tanaka, Kanagawa (JP); Haruki Chujo, Tokyo (JP)

(73) Assignee: Sony Corporation, Tokyo (JP)

( * ) Notice: Subject to any disclaimer, the term of this patent is extended or adjusted under 35 U.S.C. 154(b) by 935 days.

(21) Appl. No.: 11/652,762

(22) Filed: Jan. 12, 2007

(65) Prior Publication Data

US 2007/0229676 A1    Oct. 4, 2007

(30) Foreign Application Priority Data

Jan. 16, 2006  (JP) .................................. 2006-007887

(51) Int. Cl.
*G06K 9/00* (2006.01)
*G09G 5/02* (2006.01)

(52) U.S. Cl. ........................ 382/167; 345/589
(58) Field of Classification Search .................... 382/167
See application file for complete search history.

(56) References Cited

U.S. PATENT DOCUMENTS

| | | | | |
|---|---|---|---|---|
| 5,428,465 A * | 6/1995 | Kanamori et al. | ............ | 358/518 |
| 5,452,018 A * | 9/1995 | Capitant et al. | ............... | 348/651 |
| 6,275,235 B1 * | 8/2001 | Morgan, III | ................... | 345/582 |
| 6,571,010 B1 * | 5/2003 | Inoue | ............................ | 382/162 |
| 6,791,569 B1 * | 9/2004 | Millet et al. | .................. | 345/611 |
| 2001/0013857 A1 * | 8/2001 | Anthony et al. | ............... | 345/157 |
| 2002/0001409 A1 * | 1/2002 | Chen et al. | ..................... | 382/167 |
| 2003/0035156 A1 * | 2/2003 | Cooper | ........................ | 358/516 |
| 2003/0193579 A1 * | 10/2003 | Mori et al. | ................. | 348/222.1 |
| 2003/0210332 A1 * | 11/2003 | Frame | ........................ | 348/216.1 |
| 2004/0032418 A1 * | 2/2004 | Cosman | ........................ | 345/645 |
| 2004/0036692 A1 * | 2/2004 | Alcorn et al. | .................. | 345/582 |
| 2005/0254073 A1 * | 11/2005 | Braun et al. | .................... | 358/1.9 |
| 2006/0251323 A1 * | 11/2006 | MacKinnon et al. | ......... | 382/167 |

FOREIGN PATENT DOCUMENTS

| | | |
|---|---|---|
| JP | 09-186905 | 7/1997 |
| JP | 03-288277 | 1/1998 |
| JP | 10-079954 | 3/1998 |
| JP | 2001-197321 | 7/2001 |
| JP | 2002-058042 | 2/2002 |
| JP | 2004-274742 | 9/2004 |
| JP | 2005-184209 | 7/2005 |

* cited by examiner

*Primary Examiner* — David Zarka

(74) *Attorney, Agent, or Firm* — Rockey, Depke & Lyons, LLC; Robert J. Depke

(57) ABSTRACT

A physical quantity interpolating method includes interpolating a third vector sandwiched between first and second vectors on the basis of a ratio of vector products computed using coordinate data of the first and second vectors and coordinate data of the third vector, the first and second vectors representing physical quantities.

15 Claims, 14 Drawing Sheets

PHYSICAL QUANTITY INTERPOLATING METHOD, AND COLOR SIGNAL PROCESSING CIRCUIT AND CAMERA SYSTEM USING THE SAME

The present invention contains subject matter related to Japanese Patent Application JP 2006-007887 filed in the Japanese Patent Office on Jan. 16, 2006, the entire contents of which are incorporated herein by reference.

CROSS REFERENCES TO RELATED APPLICATIONS

The present invention contains subject matter related to Japanese Patent Application JP 2006-007887 filed in the Japanese Patent Office on Jan. 17, 2006, the entire contents of which are incorporated herein by reference.

BACKGROUND OF THE INVENTION

1. Field of the Invention

The present invention obtains reference vectors representing physical quantities and corrects a correction vector using correction data of the reference vectors. More particularly, the present invention relates to a physical quantity interpolating method of interpolating a color signal in a color space on the basis of the ratio of vector products in coordinates and linear interpolation using amplitudes and angles of the reference vectors, thereby correcting an arbitrary color signal, and a color signal processing circuit and a camera system using the same.

2. Description of the Related Art

Generally, a color image device is equipped with a color conversion circuit for converting the color of an image signal in accordance with input characteristics inherent in the color image device so that satisfactory color reproducibility can be added to pixel signals. A digital camera or the like generally has a matrix circuit or a lookup table circuit for converting a primary or complementary color signal into luminance (Y) and chromatic difference (UV, i.e., R-Y and B-Y) signals. After the signal is converted into the luminance and chromatic difference signals, color adjustment is performed in R-Y and B-Y coordinates.

However, the adjustment performed in this coordinate system is such that, since the signals are input in R-Y and B-Y rectangular coordinates, although individual adjustment can be performed in first to fourth quadrants defined by the R-Y and B-Y axes, it is difficult to freely divide the coordinate system according to hue (angle in polar coordinates) and perform adjustment individually in divided sections.

In such an image adjustment apparatus, in order to improve the color reproducibility from a captured color image input thereto, an adjustment circuit that divides the coordinate system into plural sections according to highly definite hue can be realized by, as implemented in Japanese Unexamined Patent Application Publication No. 2004-274742, having a mechanism for performing a rectangular to polar conversion of chromatic difference signals (R-Y and B-Y) to give luminance, saturation, and hue components and having, after color correction is performed, a mechanism for converting the saturation/hue components back to the chromatic difference signals.

SUMMARY OF THE INVENTION

Operations shown in Japanese Unexamined Patent Application Publication No. 2004-274742 theoretically involve trigonometric operations including arctangent (arctan) operations or the like. Without approximation, hardware cost is very high. Such a conversion circuit may result in signal deterioration and an increase in circuit size.

In the course of interpolation of a correction amount in a color correction operation, each color space is represented in polar coordinates, and each color is independently corrected in polar coordinates. It is thus necessary to simplify the operation method in order not to increase the size of hardware for performing these operations.

In order to simplify calculations, it is necessary that coordinates other than polar coordinates, such as rectangular coordinates, be used so that color correction operations can be performed.

In color correction using polar coordinates, it is desirable to adjust a color signal existing in any hue region while allowing a user to freely set correction amounts and to simplify such a correction circuit for correcting saturation/hue.

A physical quantity interpolating method according to an embodiment of the present invention includes interpolating a third vector sandwiched between first and second vectors on the basis of a ratio of vector products computed using coordinate data of the first and second vectors and coordinate data of the third vector, the first and second vectors representing physical quantities.

A physical quantity interpolating method according to another embodiment of the present invention includes computing a correction amount of a third vector sandwiched between first and second vectors by performing linear interpolation using amplitudes and angles of polar coordinate data of the first and second vectors and of the third vector, the first and second vectors representing physical quantities.

A color signal processing circuit according to another embodiment of the present invention includes the following elements: a region/representative-point determination unit operable to select, from among representative points of color signals set in advance in coordinates, at least first and second representative points sandwiching an input color signal, the first and second representative points serving as reference points; a correction amount calculator operable to compute vector products using coordinates of the first and second representative points and of the input color signal and to derive a correction amount of the input color signal using the computed vector products and correction amounts of the first and second reference points; and a saturation/hue correction unit operable to perform an arithmetic operation of the correction amount derived by the correction amount calculator and the uncorrected color signal and to output an operation result.

A color signal processing circuit according to another embodiment of the present invention includes the following elements: a chromatic difference signal-to-saturation/hue converter operable to convert a color signal represented in rectangular coordinates into polar coordinates; a region/representative-point determination unit operable to select, from among representative points of color signals set in advance in coordinates, at least first and second representative points sandwiching an input color signal, the first and second representative points serving as reference points; a correction amount calculator operable to compute a correction amount of the input color signal by performing linear interpolation using amplitudes and angles of polar coordinate data of the first and second representative points and of the input color signal; a saturation/hue correction unit operable to perform an arithmetic operation of the correction amount derived by the correction amount calculator and the uncorrected input color signal and to output an operation result; and a saturation/hueto-chromatic difference signal converter operable to convert data of the color signal output from the saturation/hue correction unit into rectangular coordinates.

A camera system according to another embodiment of the present invention is a camera system for receiving an image signal via a lens, extracting a color signal from the image signal output from an imager having an arrangement of a plurality of light-receiving elements, correcting color of the color signal using a color signal processing circuit, and outputting the color-corrected color signal. The color signal processing circuit includes the following elements: a region/representative-point determination unit operable to select, from among representative points of color signals set in advance in coordinates, at least first and second representative points sandwiching an input color signal, the first and second representative points serving as reference points; a correction amount calculator operable to compute vector products using coordinates of the first and second reference points and of the input color signal and to derive a change amount of the input color signal using the computed vector products and change amounts of the first and second reference points; and a saturation/hue correction unit operable to perform an arithmetic operation of the correction amount derived by the correction amount calculator and the uncorrected color signal and to output an operation result.

A camera system according to another embodiment of the present invention is a camera system for receiving an image signal via a lens, extracting a color signal from the image signal output from an imager having an arrangement of a plurality of light-receiving elements, correcting color of the color signal using a color signal processing circuit, and outputting the color-corrected color signal. The color signal processing circuit includes the following elements: a chromatic difference signal-to-saturation/hue converter operable to convert a color signal represented in rectangular coordinates into polar coordinates; a region/representative-point determination unit operable to select, from among representative points of color signals set in advance in coordinates, at least first and second representative points sandwiching an input color signal, the first and second representative points serving as reference points; a correction amount calculator operable to compute a correction amount of the input color signal by performing linear interpolation using amplitudes and angles of polar coordinate data of the first and second representative points and of the input color signal; a saturation/hue correction unit operable to perform an arithmetic operation of the correction amount derived by the correction amount calculator and the uncorrected color signal and to output an operation result; and a saturation/hue-to-chromatic difference signal converter operable to convert data of the color signal output from the saturation/hue correction unit into rectangular coordinates.

In the physical quantity interpolating method and the color signal processing circuit and the camera system using the same according to the embodiments of the present invention, for example, when color correction in X and Y coordinates (rectangular coordinates) is performed with an interpolation method using the ratio of areas of triangles or the like, processing operations can be performed in the rectangular coordinate system, without conducting a coordinate conversion. Thus, the number of complicated operations involved in a polar coordinate conversion is reduced, and the circuit size is prevented from increasing.

When correction is applied to a color signal in polar coordinates, the color signal is interpolated and corrected using two adjacent color signals. Thus, the correction amount of the color signal can be easily computed, and color correction can be performed without involving an increase in hardware size, unlike in a previously known color correction algorithm. This color correction algorithm in polar coordinates involves linear interpolation using angle (hue), thereby adjusting arbitrary saturation/hue and simplifying the hardware.

Using two adjacent color signals obtained by region determination, a color signal sandwiched therebetween can be corrected such that the color at any position in coordinates can be arbitrarily selected and corrected. Unlike in a known color correction algorithm in which all colors are uniformly corrected or only colors within a specific range can be corrected, the degree of freedom in color correction is increased, and, as a result, color can be more precisely defined.

DESCRIPTION OF THE PREFERRED EMBODIMENTS

Figure 1:
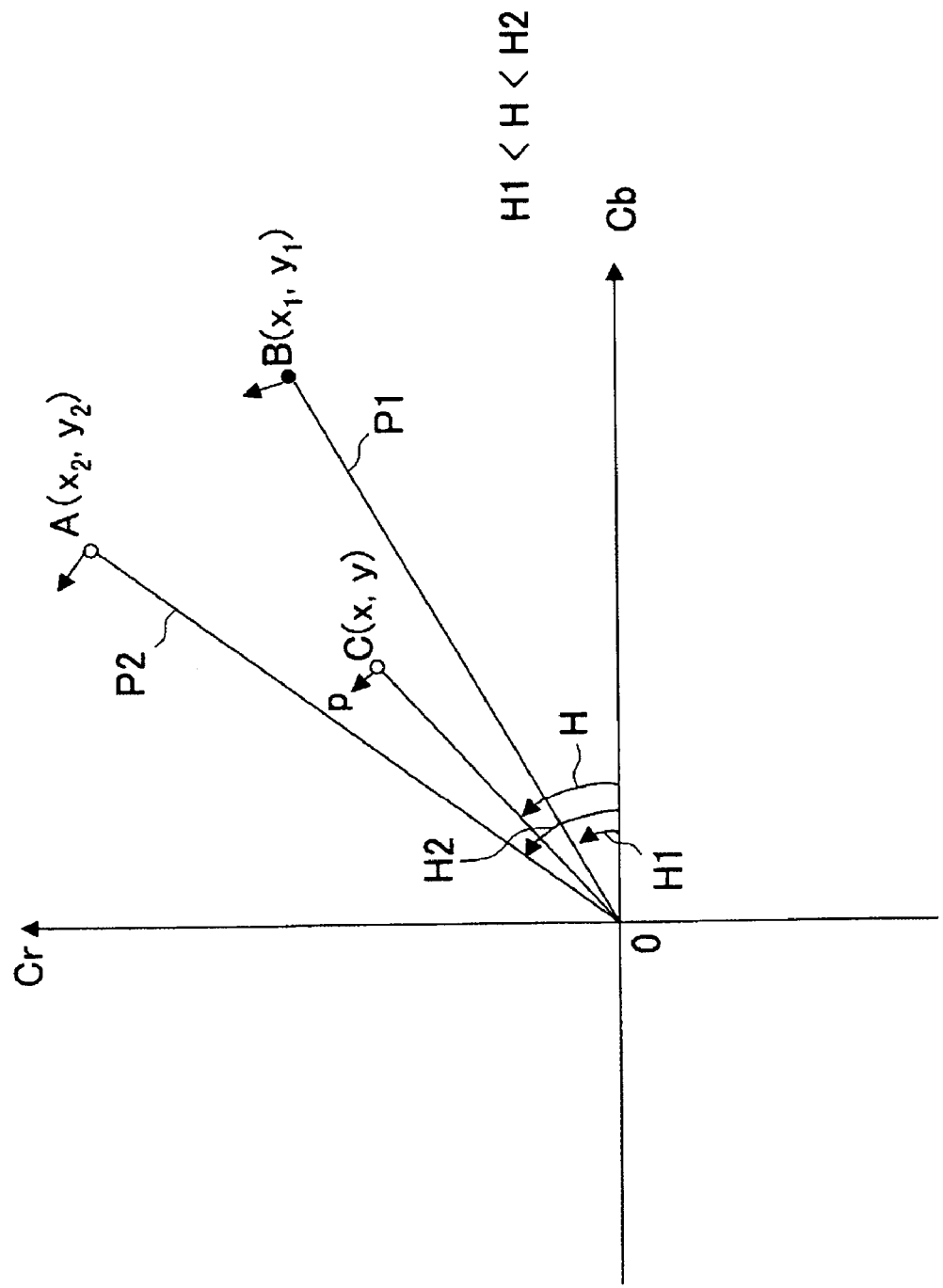
FIG. 1 shows coordinates for describing the principle of an interpolation method according to an embodiment of the present invention.

An interpolation method for describing the principle of an embodiment of the present invention, which is shown in FIG. 1, will be described.

An interpolation method of computing the coordinates of an arbitrary chromatic (difference) signal from the rectangular coordinates (x, y) without using polar coordinates will be described. That is, a physical quantity serves as a color signal, and, in a coordinate system of saturation/hue representing the color signal, interpolation is performed using a plurality of vectors of color signals, thereby correcting a color signal.

In this interpolation method, reference chromatic difference signals (representative points) are placed at arbitrary intervals in coordinates. For example, representative points are placed at arbitrary amplitudes and angles so as to rotate 360 degrees around the origin O. In this way, a chromatic difference signal to be corrected can be sandwiched between arbitrary two chromatic difference signals at any positions in coordinates. For example, 12 colors, 16 colors, or 32 colors can be placed at substantially equal intervals in a circumferential direction in first to fourth quadrants.

Referring to FIG. 1, on the basis of an arbitrary point representing a chromatic difference signal, reference chromatic difference signals serving as two reference points that sandwich the chromatic difference signal and that are closest to the chromatic difference signal are specified. Described below is an example in which Cb (B-Y) is plotted on the X axis, Cr (R-Y) is plotted on the Y axis, and (P1, P2) are arbitrary representative points representing chromatic difference signals.

Assume P is a vector of a chromatic difference signal to which color correction will be applied, and C(x, y) are the coordinates of the vector P. Assume P1 is a vector of one of reference chromatic difference signals serving as two predetermined representative points sandwiching P, and B(x1, y1) are the coordinates of the vector P1. Assume P2 is a vector of the other one of the reference chromatic difference signals, and A(x2, y2) are the coordinates of the vector P2. Arrows in FIG. 1 represent correction amounts (vectors) at the coordinates B(x1, y1), A(x2, y2), and C(x, y), which are represented as (Δx1, Δy1), (Δx2, Δy2), and (Δx, Δy). In particular, the correction amounts (Δx1, Δy1) and (Δx2, Δy2) can be arbitrarily set.

With continued reference to FIG. 1, the areas of three triangles ΔOAB (S3), ΔOAC (S2), and ΔOBC (S1) defined by the coordinates O (origin) and the coordinates A, B, and C are expressed as:

$$\Delta OAB = |x2^*y1 - y2^*x1|$$

$$\Delta OAC = |x2^*y - y2^*x|$$

$$\Delta OBC = |x^*y1 - y^*x1| \quad (1)$$

where * represents a multiplication symbol.

An exemplary method of computing the area of the triangle ΔOAC will be described using FIG. 2.

Figure 2:
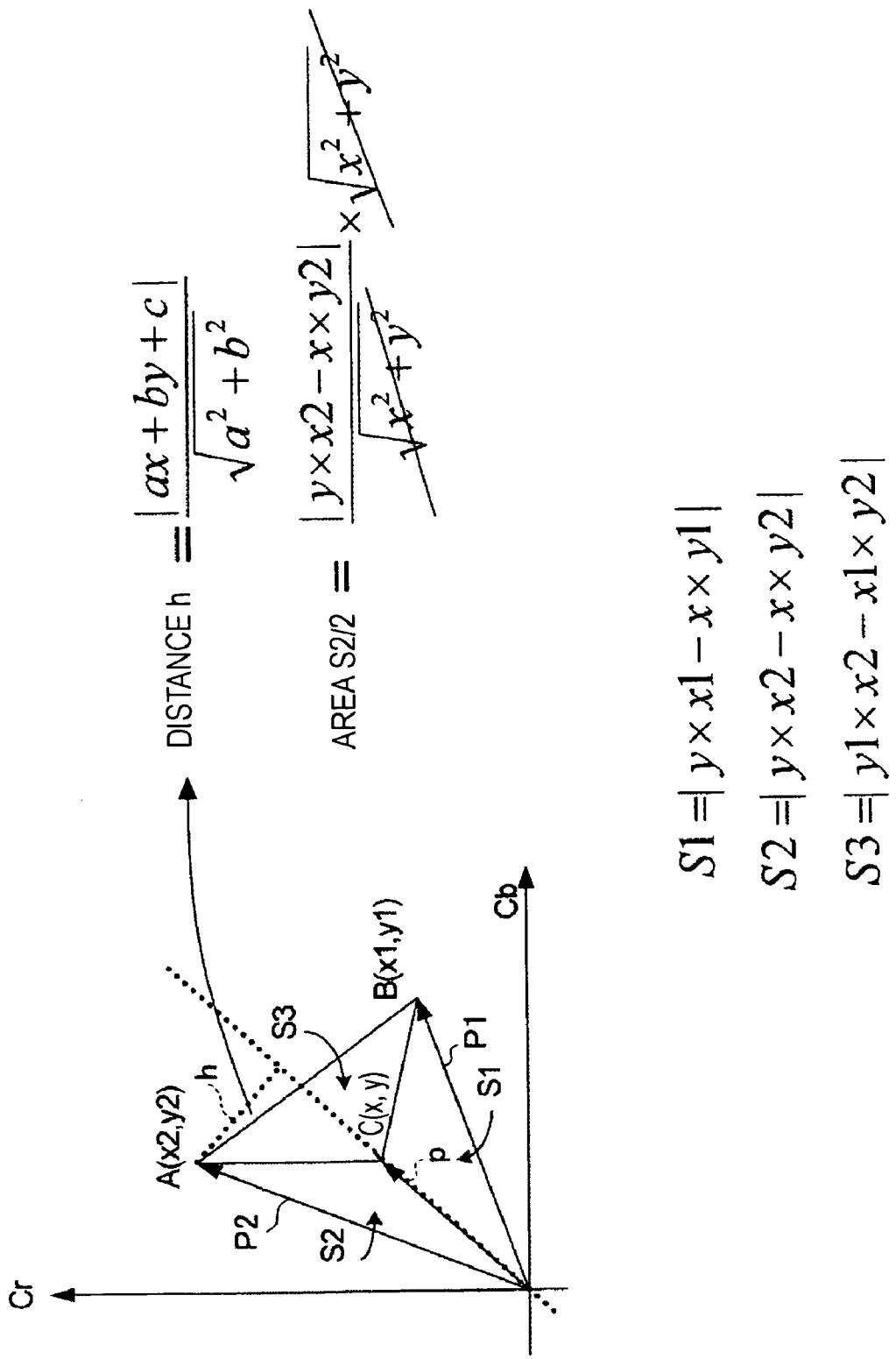
FIG. 2 is a diagram showing how areas defined by vectors are computed, which are used to describe the interpolation method.

In rectangular coordinates shown in FIG. 2, a chromatic difference signal Cb is plotted on the X-axis, and a chromatic difference signal Cr is plotted on the Y-axis. The first vector P1 points from the origin O to the coordinates B(x1, y1), the second vector P2 points from the origin O to the coordinates A(x2, y2), and the vector P sandwiched between the first and second vectors P1 and P2 points from the origin O to the coordinates C(x, y).

The equation of the straight line passing through the origin and the coordinates C(x, y) of the vector P is expressed as ax+bx+c. When a perpendicular is drawn from the coordinates A(x2, y2) of the vector P2 to the straight line, the distance h from the point A(x2, y2) to the straight line is:

$$h = |ax2 + by2 + c|/(a^2 + b^2)^{1/2} \quad (2)$$

On the basis of the origin O, the area of the triangle ΔOAC (S2) defined by the coordinates C(x, y) of the vector P and the coordinates A(x2, y2) of the vector P2 is:

$$S2 = \left\{|y*x2 - x*y2|/(x^2 + y^2)^{\frac{1}{2}}\right\} * (x^2 + y^2)^{\frac{1}{2}} = |y*x2 - x*y2| \quad (3)$$

where * represents a multiplication symbol.

Alternatively, the area of the triangle can be computed using the outer product of the vectors.

Similarly, on the basis of the origin O, the area of the triangle ΔOBC (S1) defined by the coordinates B(x1, y1) of the vector P1 and the coordinates C(x, y) of the vector P is:

$$S1 = |y^*x1 - x^*y1| \quad (4)$$

In addition, on the basis of the origin O, the area of the triangle ΔOAB (S3) defined by the coordinates B(x1, y1) of the vector P1 and the coordinates A(x2, y2) of the vector P2 is:

$$S3 = |y1^*x2 - x1^*y2| \quad (5)$$

The relationship among the areas of these triangles and the vectors P1, P2, and P is stated by means of vector calculations as:

$$P = (\Delta OBC/\Delta OAB)*P2 + (\Delta OAC/\Delta OAB)*P1 = \quad (6)$$
$$(S2/S3)*P2 + (S1/S3)*P1$$

That is, a correction value of the vector P can be obtained by substituting correction values of the vectors P1 and P2 into equation (6).

Figure 3:
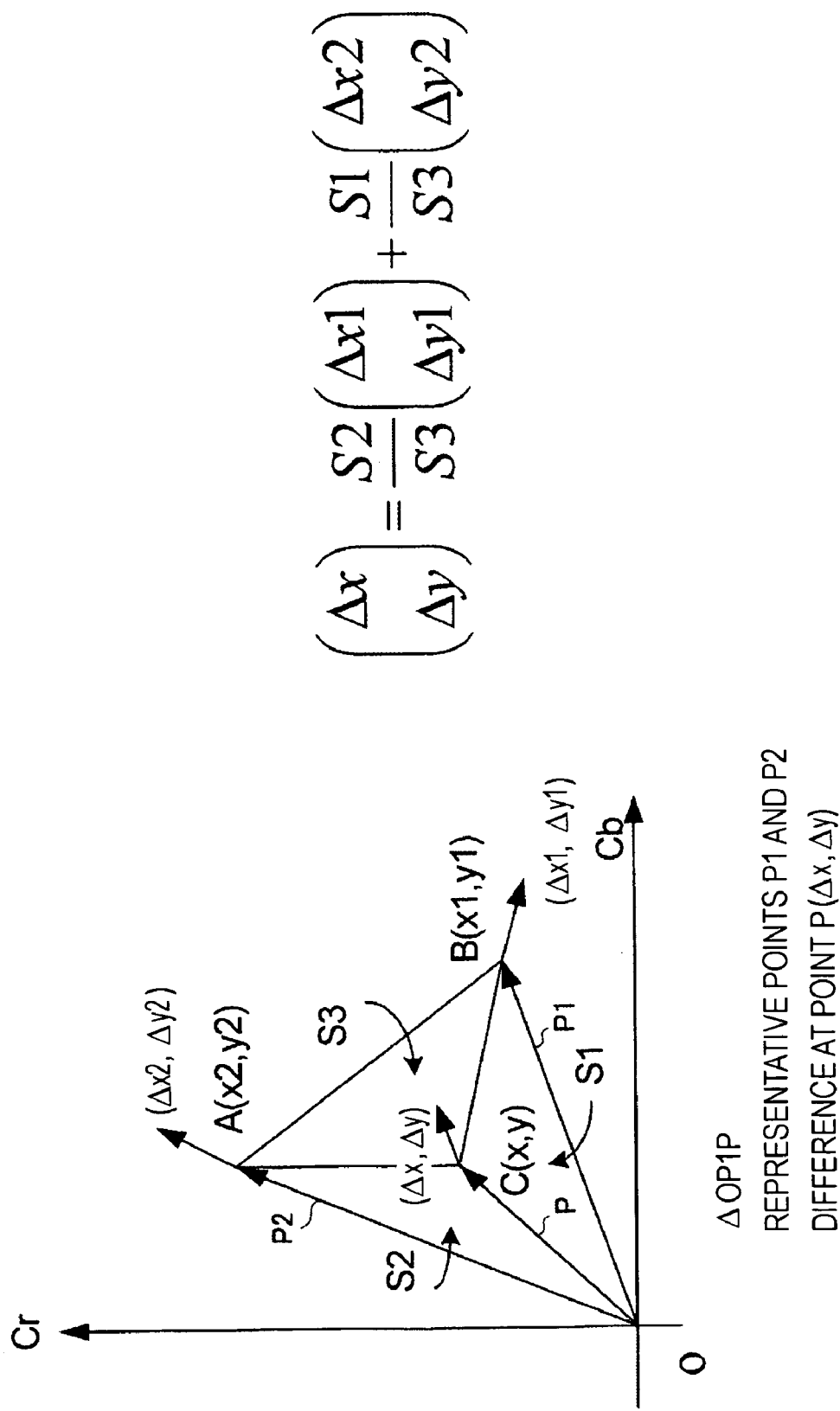
FIG. 3 shows a saturation/hue conversion algorithm.

FIG. 3 shows a saturation/hue conversion algorithm.

A method of computing the correction amount of the vector P in the case where the vector P is corrected using the vectors P1 and P2 shown in FIG. 2 will be described.

Referring to FIG. 3, assume (Δx2, Δy2) represents a difference (correction amount) of the vector P2 at the coordinates A(x2, y2), and (Δx1, Δy1) represents a difference (correction amount) of the vector P1 at the coordinates B(x1, y1). Then, (Δx, Δy), which represents a difference (correction amount) of the vector P at the coordinates C(x, y) to be computed, can be expressed as:

$$\Delta x = K1^*\Delta x1 + K2^*\Delta x2$$

$$\Delta y = K1^*\Delta y1 + K2^*\Delta y2 \quad (7)$$

where K1=(S2/S3), K2=(S1/S3), and S1, S2, and S3 are the areas of the aforementioned triangles ΔOBC, ΔOAC, and ΔOAB.

Since the coordinates of these vectors are represented in rectangular coordinates, it is not necessary to perform calculations using magnitudes and angles in polar coordinates. Color correction based on equations (7) using rectangular coordinates will be described later.

Figure 4:
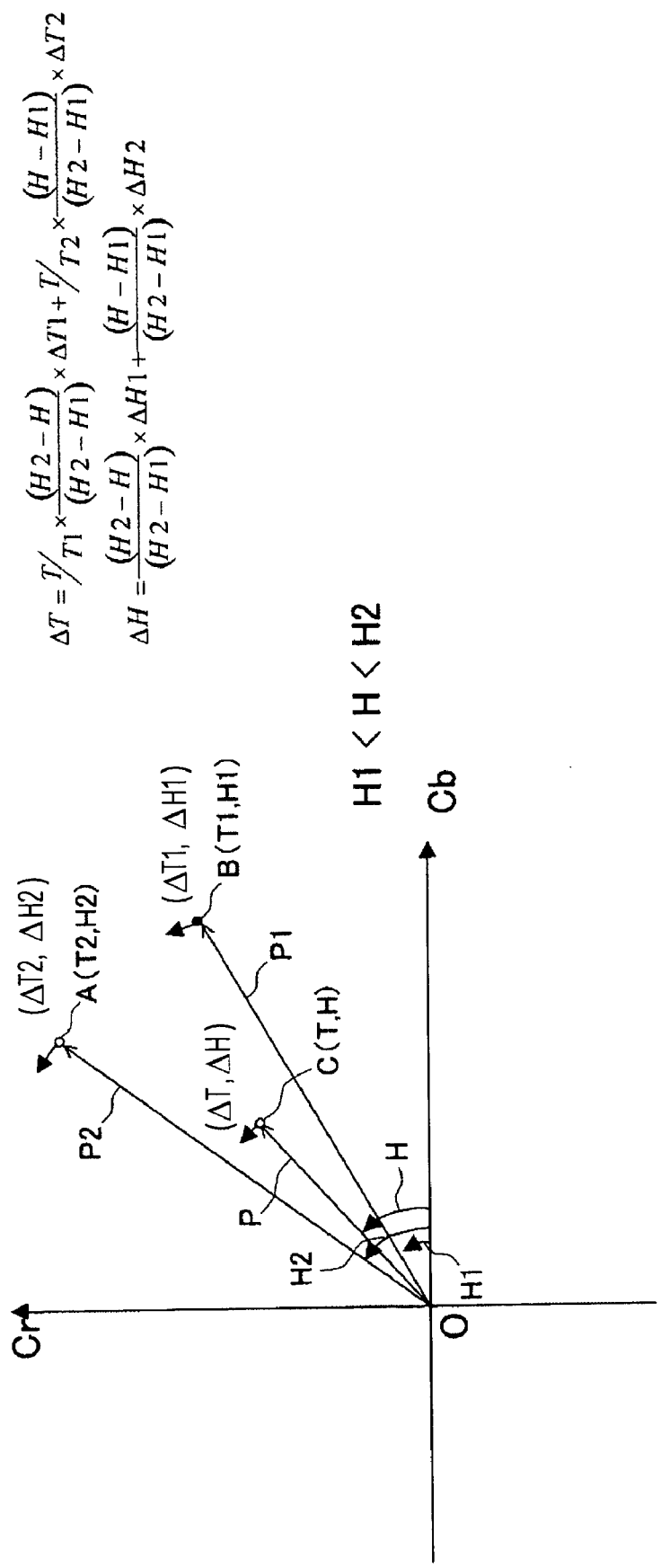
FIG. 4 shows coordinates for describing the principle of another interpolation method.

Referring to FIG. 4, another interpolation method according to an embodiment of the present invention will be described. Here, the correction amount is computed using polar coordinates, although arithmetic operations involve linear interpolation of angles (H).

When the rectangular coordinates (X, Y) are converted into polar coordinates, the following coordinates are computed: A(T2, H2) are the coordinates of the vector P2, C(T, H) are the coordinates of the vector P, and B(T1, H1) are the coordinates of the vector P1 where T, T1, and T2 represent the magnitudes of the vectors, and H, H1, and H2 represent the angles formed by the vectors relative to the X axis.

As in FIG. 3, assume (ΔT, ΔH) represents a difference of the vector P, (ΔT2, ΔH2) represents a difference of the vector P2, and (ΔT1, ΔH1) represents a difference of the vector P1. The relationship among the angles is H1<H<H2.

Under these conditions, the difference (correction amount) of the vector P sandwiched between the representative points B(T1, H1) and A(T2, H2) is computed by performing linear interpolation of hue (H) values (angles) using the amplitude, the correction amount of the amplitude, the angle, and the correction amount of the angle of each of the representative points.

The difference ΔT of the magnitude of the vector P (T represents the polar coordinate amplitude) is:

$$\Delta T = K3^*\{(H2-H)/(H2-H1)\}*\Delta T1 + K4^*\{(H-H1)/(H2-H1)\}*\Delta T2 \quad (8)$$

where K3=T/T1, and K4=T/T2.

The difference ΔH of the angle H is:

$$\Delta H = \{(H2-H)/(H2-H1)\} * \Delta H1 + \{(H-H1)/(H2-H1)\} * \Delta T2 \quad (9)$$

This shows that, when the differences of the amplitude (magnitude) and the angle of each of the two vectors P1 and P2 sandwiching the vector P are known, the difference of the vector P to be computed can be derived from equations (8) and (9). That is, the difference of the vector P to be computed can be obtained from equations (8) and (9) since, once the area in which the vector P resides is determined, the two known reference vectors P1 and P2 sandwiching the vector P and their differences are set in advance.

Figure 5:
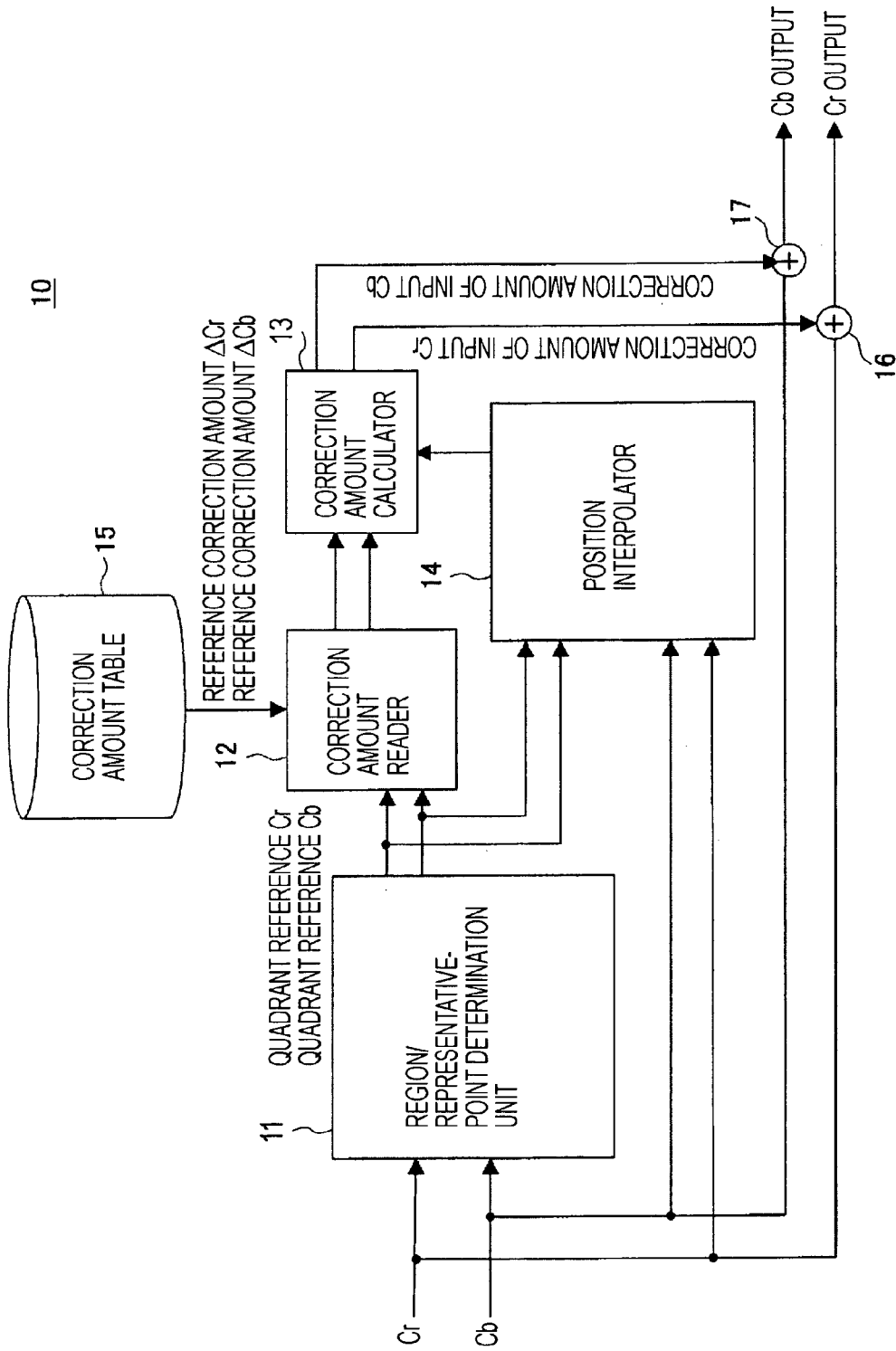
FIG. 5 is a block diagram of a saturation/hue adjuster.

FIG. 5 is a schematic block diagram of a saturation/hue adjuster 10 for use in both rectangular coordinates and polar coordinates.

The saturation/hue adjuster 10 includes a region/representative-point determination unit 11, a correction amount reader 12, a correction amount calculator 13, a position interpolator 14, a correction amount table 15, and adders 16 and 17.

The region/representative-point determination unit 11 detects the hue of input chromatic difference signal components Cr/Cb (hereinafter may also be collectively referred to as an "input chromatic difference signal Cr/Cb") to detect in which of, for example, 16 quadrants in a Cr/Cb space in coordinates the input chromatic difference signal Cr/Cb resides. Then, two chromatic difference signals sandwiching the input chromatic difference signal Cr/Cb in the coordinate space are selected, each having a quadrant reference Cr and a quadrant reference Cb. The input chromatic difference signal Cr/Cb corresponds to the aforementioned P(x, y), and the two chromatic difference signals correspond to, for example, the representative points P1(x1, y1) and P2(x2, y2).

The correction amount reader 12 reads associated reference correction amounts ΔCr and ΔCb of the two quadrant references Cr and the two quadrant references Cb selected from the correction amount table 15.

The correction amount calculator 13 calculates a correction amount of the input chromatic difference signal using the area ratio and the reference correction amounts ΔCr and ΔCb of the two reference signals.

The position interpolator 14 interpolates the position in the quadrant, computes the areas of three triangles on the basis of the origin and the coordinates of the two reference values (representative points), and the coordinates of the input chromatic difference signal Cr/Cb, and computes the area ratio.

The correction amount table 15 receives and stores reference correction amounts ΔCr and ΔCb of the chromatic difference signal components Cr/Cb in each of the quadrants.

The adders 16 and 17 add the input chromatic difference signal components Cr/Cb and the correction amounts computed by the correction amount calculator 13, thereby adjusting the saturation/hue of the chromatic difference signal.

The operation of the saturation/hue adjuster 10 will be described. The input chromatic difference signal Cr/Cb is supplied to the region/representative-point determination unit (hue quadrant determination unit) 11, which detects in which space (quadrant) in coordinates the input chromatic difference signal Cr/Cb resides. As a result, two chromatic difference signals sandwiching the input chromatic difference signal Cr/Cb are selected, each having a quadrant reference Cr and a quadrant reference Cb. The correction amount reader 12 reads reference correction amounts ΔCr and ΔCb corresponding to the quadrant references Cr and the quadrant references Cb of the selected two chromatic difference signals (representative points) from the correction amount table 15 and outputs the read correction amounts ΔCr and ΔCb to the correction amount calculator 13. The correction amounts of chromatic difference signals are input, as necessary, to the correction amount table 15 and are organized as a table.

At the same time, the position interpolator 14 uses the input chromatic difference signal Cr/Cb and the quadrant references Cr and the quadrant references Cb of the two chromatic difference signals to compute the ratio of the areas of three triangles defined by the coordinate origin and these three points.

Using the reference correction amounts ΔCr and ΔCb and the area ratio, the correction amount calculator 13 calculates the correction amounts of the input chromatic difference signal components Cr/Cb and outputs the correction amounts to the adders 16 and 17, respectively, thereby correcting the hue/saturation of the input chromatic difference signal Cr/Cb.

Figure 6:
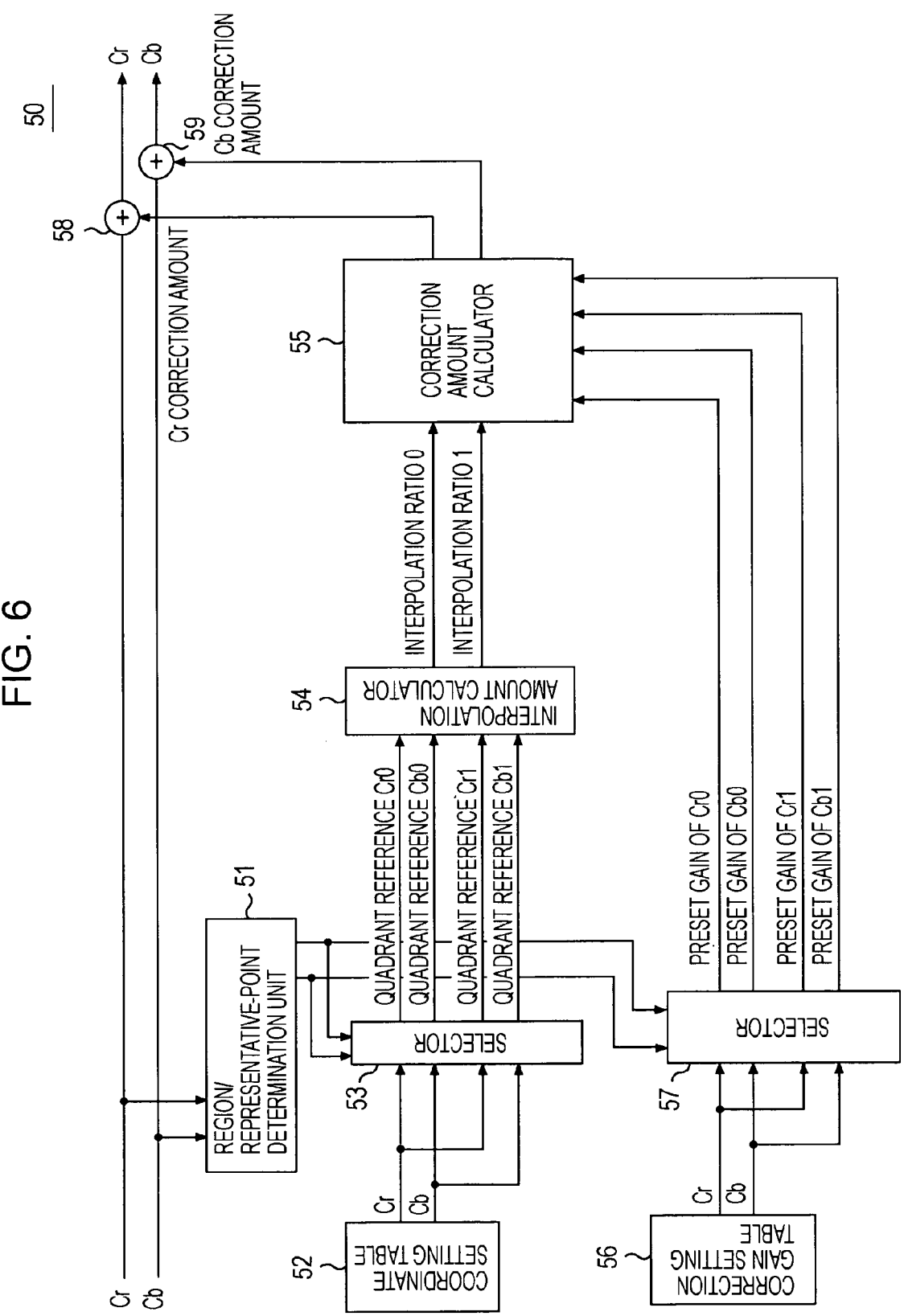
FIG. 6 shows the specific structure of the saturation/hue adjuster shown in FIG. 5.

FIG. 6 shows the specific structure of the region/representative-point determination unit 11 and the correction amount table 15 of the saturation/hue adjuster 10 shown in FIG. 5.

In a saturation/hue adjuster 50 shown in FIG. 6, a coordinate setting table 52 and a correction gain setting table 56 correspond to the correction amount table 15 shown in FIG. 5; selectors 53 and 57 correspond to the correction amount reader 12; and the position interpolator 14 is included in an interpolation value calculator 54.

The operation of the saturation/hue adjuster 50 shown in FIG. 6 will be described. The input chromatic difference signal Cr/Cb is input to a region/representative-point determination unit 51 to determine the hue. As a result, quadrant reference signals (Cr0, Cb0) and (Cr1, Cb1) of two representative points sandwiching the input chromatic difference signal Cr/Cb are selected from the coordinate setting table 52 and are output via the selector 53.

Similarly, in accordance with the determination result obtained by the region/representative-point determination unit 51, preset gains of the quadrant reference signals (Cr0, Cb0) and (Cr1, Cb1) are selected from the correction gain setting table 56 and are output via the selector 57. The preset gains of (Cr0, Cb0) and (Cr1, Cb1) are output to a correction amount calculator 55.

The quadrant reference signals (Cr0, Cb0) and (Cr1, Cb1) are supplied to the interpolation value calculator 54, which in turn calculates the areas of triangles in the coordinate space and the ratio of the areas. As a result, the interpolation ratio 0 and the interpolation ratio 1 corresponding to the quadrant reference signals (Cr0, Cb0) and (Cr1, Cb1) are output to the correction amount calculator 55.

The selector 57 supplies the preset gains of (Cr0, Cb0) and (Cr1, Cb1) to the correction amount calculator 55, which in turn calculates the correction amounts using the ratio of the areas of the triangles corresponding to the interpolation ratios 0 and 1.

The correction amounts calculated by the correction amount calculator 55 are supplied to adders 58 and 59, respectively. The adders 58 and 59 each add the correction amount to the input chromatic difference signal Cr/Cb, thereby adjusting the saturation/hue of the chromatic difference signal Cr/Cb.

There are two types of arithmetic operations performed by the interpolation value calculator 54 and the correction amount calculator 55. Specifically, the two types include calculations in rectangular coordinates and calculations in polar coordinates. Each of the two types will be described later.

Figure 7:
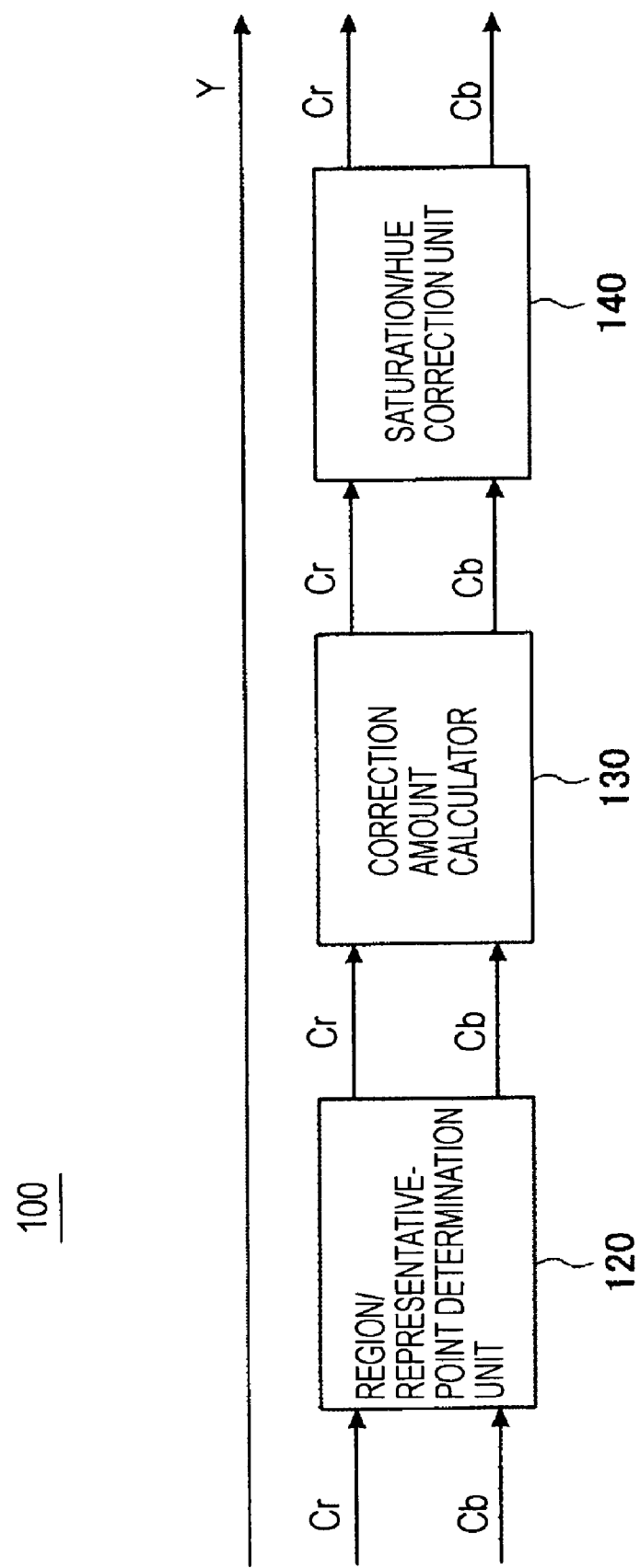
FIG. 7 is a block diagram of the saturation/hue adjuster.

FIG. 7 shows the specific structure of a saturation/hue adjuster 100 using a rectangular coordinate system.

Since the saturation/hue adjuster 100 performs arithmetic operations in the rectangular coordinate system, it is not necessary to conduct a rectangular to polar conversion. The saturation/hue adjuster 100 includes three main blocks, namely, a region/representative-point determination unit 120, a correction amount calculator 130, and a saturation/hue correction unit 140. Besides these three blocks, there is a luminance signal Y.

Here, the region/representative-point determination unit 120 shown in FIG. 7 corresponds to the region/representative-point determination unit 51 shown in FIG. 6. Besides the region/representative-point determination unit 120, the detailed blocks of the coordinate setting table 52, the correction gain setting table 56, and the selectors 53 and 57 are not shown in FIG. 7. The correction amount calculator 130 corresponds to the interpolation value calculator 54 and the correction amount calculator 55. The saturation/hue correction unit 140 corresponds to the adders 58 and 59.

The region/representative-point determination unit 120 (51) determines a region on the basis of an input chromatic difference signal and obtains quadrant references Cr and Cb (representative points) of two representative points that sandwich the input chromatic difference signal and that are closest to the input chromatic difference signal.

Figure 8:
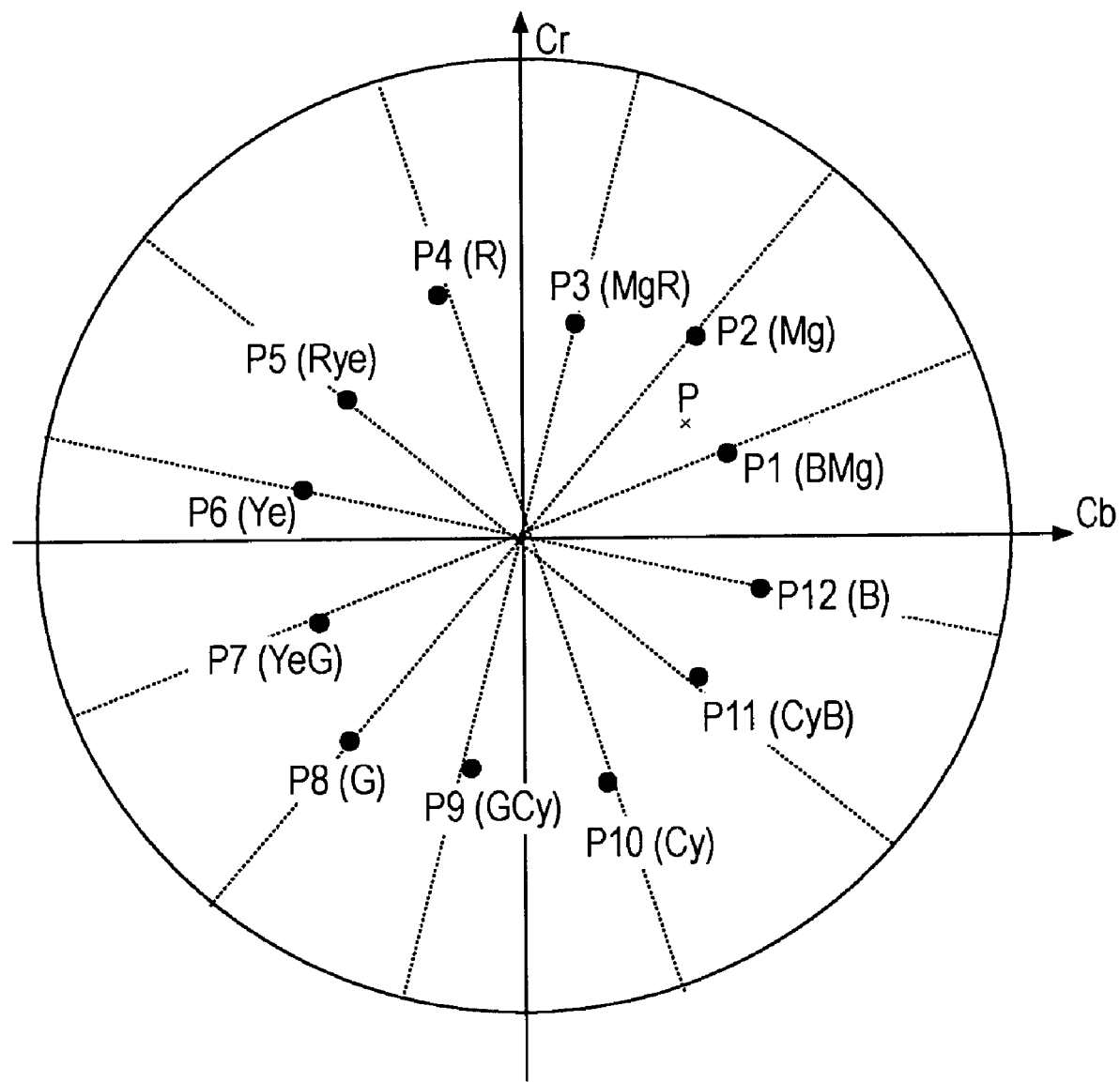
FIG. 8 is a diagram showing twelve representative points on a chromatic difference signal plane chart.

FIG. 8 shows, for example, twelve predetermined representative points (quadrant references) serving as references therefor. When the X axis represents the chromatic difference signal component Cb and the Y axis represents the chromatic difference signal component Cr, predetermined chromatic difference signals P1 (BMg) to P12 (B) are set around the origin in a counterclockwise direction. Table 1 summarizes red (R), green (G), and blue (B) values, the rectangular coordinates (X, Y), and the polar coordinates (T, H) of the chromatic difference signals of the twelve representative points:

On the basis of equations (3) to (5), the correction amount calculator 130 calculates the areas of triangles defined by the chromatic difference signal P to be corrected and the two chromatic difference signals P1 and P2 (representative points) sandwiching the chromatic difference signal P, relative to the origin O of the rectangular coordinate system, as has been described using FIGS. 2 and 3. Next, the correction amount calculator 130 calculates the difference of the chromatic difference signal P using equations (7), thereby obtaining the correction amount. Here, the differences (correction amounts) of the chromatic difference signals (representative points) are set in advance, stored in, for example, a storage device, and organized as a table.

The saturation/hue correction unit 140 performs color correction (adjustment) on the basis of the differences of the chromatic difference signal to be corrected, which are calculated by the correction amount calculator 130. That is, the chromatic difference signal is corrected by adding the X value and the Y value of the input chromatic difference signal to the correction amounts Δx and Δy, respectively. Advantageously, the color correction can be performed independently of color correction of other chromatic difference signals and can be arbitrarily performed regardless of in which quadrant of the rectangular coordinate system the chromatic difference signal to be corrected resides.

Next, the operation of the saturation/hue adjuster 100 will be described using the Cb/Cr plane chart shown in FIG. 8 and an algorithm 200 shown in FIG. 9.

When the chromatic difference signal P(x, y) is input to the region/representative-point determination unit 120 shown in FIG. 7, region determination is carried out. On the basis of the coordinate point P(x, y) of the input chromatic difference

TABLE 1

|   | BMg | Mg | MgR | R | RYe | Ye | YeG | G | GCy | Cy | CyB | B |
|---|---|---|---|---|---|---|---|---|---|---|---|---|
| R | 128 | 255 | 255 | 255 | 255 | 255 | 128 | 0 | 0 | 0 | 0 | 0 |
| G | 0 | 0 | 0 | 0 | 128 | 255 | 255 | 255 | 255 | 255 | 128 | 0 |
| B | 255 | 255 | 128 | 0 | 0 | 0 | 0 | 0 | 128 | 255 | 255 | 255 |
| X (Cb) | 105.86 | 84.404 | 20.900 | −43.115 | −85.464 | −127.50 | −106.03 | −84.393 | −20.397 | 43.129 | 85.147 | 127.50 |
| Y (Cr) | 43.355 | 106.84 | 117.13 | 127.48 | 73.862 | 20.637 | −42.856 | −106.85 | −117.22 | −127.49 | −74.275 | −20.624 |
| Y | 67.34 | 105.31 | 90.84 | 76.24 | 151.38 | 225.93 | 187.96 | 149.69 | 164.28 | 178.75 | 104.21 | 29.07 |
| T | 114.40 | 136.16 | 118.98 | 134.59 | 112.96 | 129.16 | 114.37 | 136.16 | 118.98 | 134.59 | 112.99 | 129.16 |
| H | 22.27 | 51.69 | 79.88 | 108.68 | 139.16 | 170.80 | 202.00 | 231.69 | 260.12 | 288.68 | 318.89 | 350.80 |

In Table 1, the chromatic difference signals are shown in horizontal rows, and the R, G, and B data, X(Cb) and Y(Cr) values in the case of rectangular coordinates, and T and H values in the case of polar coordinates are shown in vertical columns.

Table 1 sequentially shows the rectangular coordinates (x, y) of the twelve representative points such that the rectangular coordinates of P1 (BMg) are (105.86, 43.355), of P2(Mg) are (84.404, 106.84), of P3(MgR) are (20.900, 117.13), ... and of P12(B) are (127.50, −20.624).

Here, "BMg" of P1(BMg) states that P1 is the chromatic difference signal sandwiched between P12(B) and P2(Mg). The same applies to the other representative points P3, P5, P7, P9, and P11. When an arbitrary chromatic difference signal is input in the coordinate system where these representative points are located, phase determination is carried out to determine the region in which the input signal resides. For example, when a chromatic difference signal P residing between P2(Mg) and P1(BMg) is input, the coordinates P(x, y) are compared with the coordinates of the twelve representative points, thereby determining the chromatic difference signals (representative points) P1(BMg) and P2(Mg) that sandwich P(x, y) and that are closest to P(x, y).

signal P, a representative point whose phase is closest and less than or equal to the coordinate point P(x, y) of the input chromatic difference signal P and a representative point whose phase is closest to and greater than the coordinate point P(x, y) of the input chromatic difference signal P are selected, thereby selecting two representative points. In the algorithm 200 shown in FIG. 9, these processing operations are performed by a reference-point ((x1, y1) and (x2, y2)) determination unit 210.

The representative points are selected, for example, in the following manner. Assume the coordinates of the input chromatic difference signal P are P(x, y)=(98.70, 57.83). Then, a phase value (X, Y) under this condition is compared with phase values of the representative points, namely, P1(105.86, 43.355), P2(84.404, 106.84), ..., and P12(127, −20).

In the course of phase comparison operations in which P(98.70, 57.83) is compared with the representative points P1(105.86, 43.355), P2(84.404, 106.84), ..., and P12(127, −20), when the sign of phase difference between the compared values changes, representative points before and after this point are selected as two representative points sandwiching the input chromatic difference signal P, and the comparison operation from this point onward is stopped.

As a result, for the chromatic difference signal P(98.70, 57.83), the coordinates of representative points are determined as P1(x1, y1)=(105.86, 43.355) and P2(x2, y2)=(84.404, 106.84).

Although the representative points are obtained using the phase values, the representative points may be obtained by various other methods, and the present invention is not limited to the above-described determination method.

When the representative points P1(105.86, 43.355) and P2(84.404, 106.84) are determined by the region/representative-point determination unit 120, these reference points serve as reference points, and the correction amount of the chromatic difference signal P is computed by the correction amount calculator 130. Referring to FIG. 9, this is shown in an area calculator 220 of the algorithm 200.

The area calculator 220 calculates the areas of the triangles $\triangle OP1P$ (=S1), $\triangle OP2P$ (=S2), and $\triangle OP1P2$ (=S3), which are shown in equation (6):

$$S1=|105.86*57.83-43.355*98.70|=1842.7453$$

$$S2=|84.404*57.83-106.84*98.70|=5664.02468$$

$$S3=|43.355*84.404-105.86*106.84|=7650.74698$$

Figure 9:
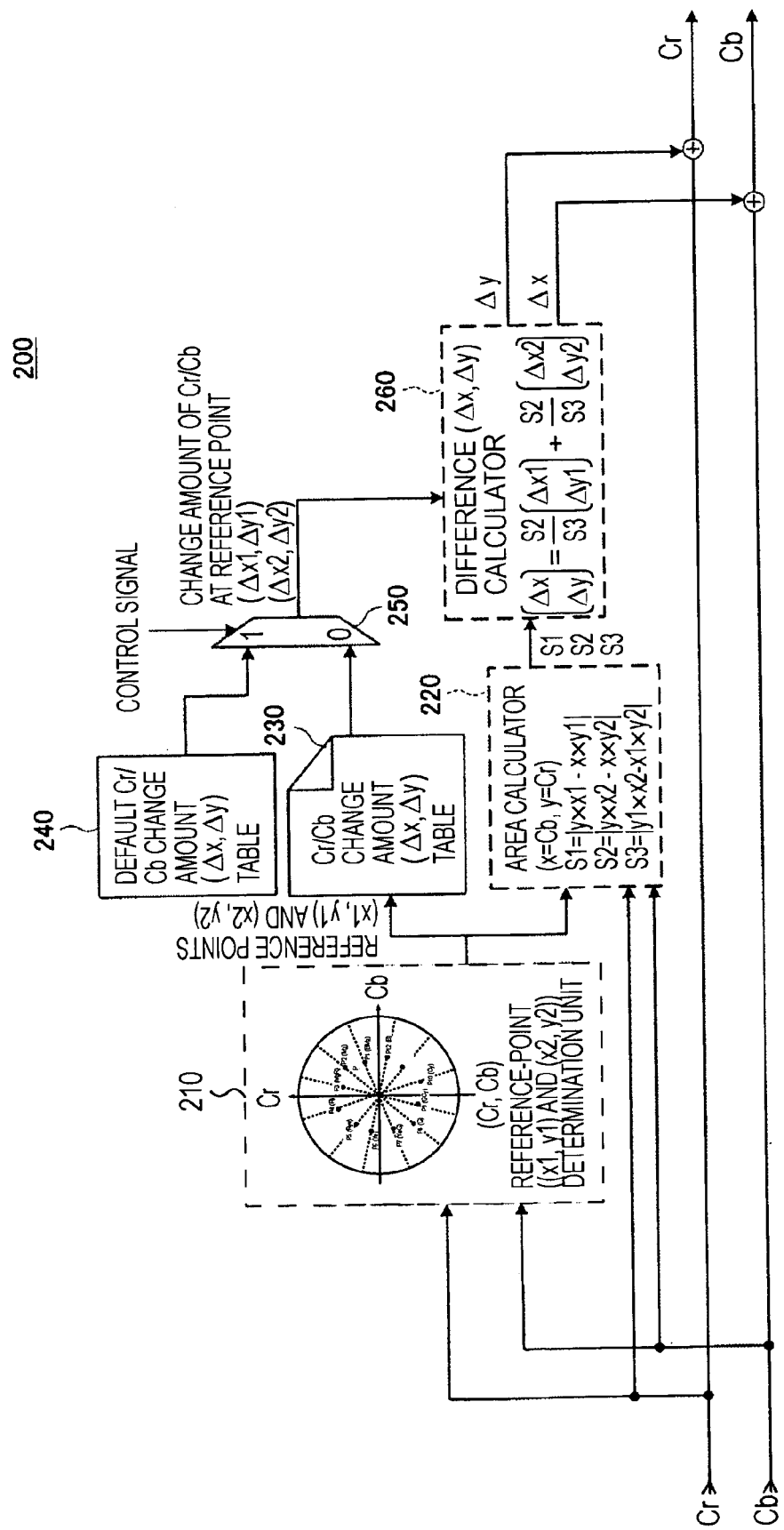
FIG. 9 is a block diagram for describing the operation in rectangular coordinates of the saturation/hue adjuster shown in FIG. 5.

When these reference points P1(105.86, 43.355) and P2(84.404, 106.84) are obtained, a reference is made to a Cr/Cb change amount ($\Delta x$, $\Delta y$) table 230 shown in FIG. 9. That is, a reference is made to a change amount (correction amount) in the X-axis direction and a change amount (correction amount) in the Y-axis direction of each of the coordinate points P1(105.86, 43.355) and P2(84.404, 106.84), and these change amounts are now ($\Delta x1$, $\Delta y1$) and ($\Delta x2$, $\Delta y2$).

At the same time, default values (0, 0) are set to all the reference points in advance in a storage device. A block for setting the default values is shown in a default Cr/Cb change amount ($\Delta x$, $\Delta y$) table 240 shown in FIG. 9.

Output data from the default Cr/Cb change amount ($\Delta x$, $\Delta y$) table 240 and output data from the Cr/Cb change amount ($\Delta x$, $\Delta y$) table 230 are supplied to a (table) selector 250. By switching the selector 250 using a control signal, one of the correction data is output to a difference ($\Delta X$, $\Delta Y$) calculator 260.

Assume the correction amounts at P1 and P2 are ($\Delta x1$, $\Delta y1$)=(10.829, −0.2563) and ($\Delta x2$, $\Delta y2$)=(5.09285, 14.9722). Since K1=S2/S3=0.7406 and K2=S1/S2=0.2405, the correction amount of P is computed using equations (7):

$$\Delta x=K1*\Delta X1+K2*\Delta X2=9.24478783$$

$$\Delta y=K1*\Delta Y1+K2*\Delta Y2=3.41099832$$

Since the coordinates P(x, y) of the chromatic difference signal P can be computed by adding the correction amount ($\Delta x$, $\Delta y$) to the input chromatic difference signal P, P(x, y)=(x+$\Delta x$, y+$\Delta y$)=(107.944788, 62.2409983) (accuracy is arbitrary).

As has been described above, when the saturation/hue coordinate system is the rectangular coordinate system, interpolation and correction of a chromatic difference signal to be corrected using a plurality of vectors involves no coordinate conversion or arctangent (arctan) calculation, and only involves multiplication, addition, and subtraction. Thus, the processing speed is increased. Furthermore, the circuit size of hardware implementing this processing is prevented from increasing, and precise adjustment can be performed.

Another embodiment of the present invention will be described. In correction of a chromatic difference signal in polar coordinates, a saturation/hue adjustment block 300 uses a linear interpolation method using angles (hue values).

The saturation/hue adjustment block 300 includes five main blocks, namely, a chromatic difference-to-saturation/hue (Cr/Cb to T/H) converter 310, a region/representative-point determination unit 320, a correction amount calculator 330, a saturation/hue correction unit 340, and a saturation/hue-to-chromatic difference (T/H to Cr/Cb) converter 350.

Figure 10:
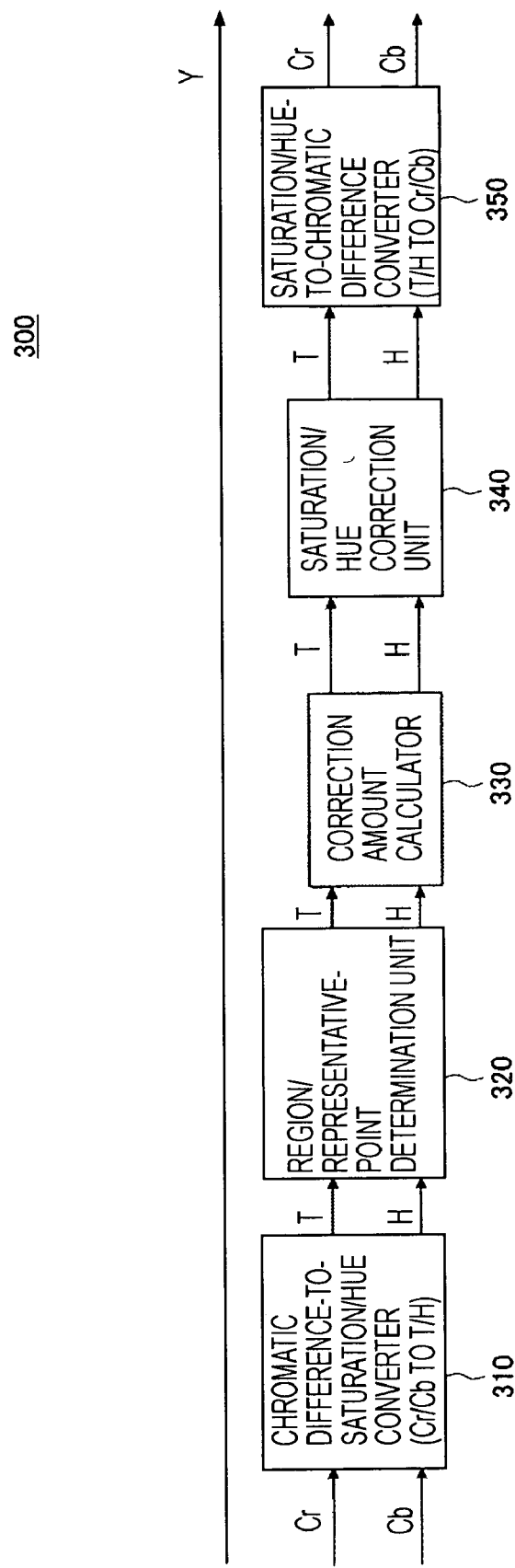
FIG. 10 is a block diagram for describing the operation in polar coordinates of the saturation/hue adjuster shown in FIG. 5.

The region/representative-point determination unit 320 shown in FIG. 10 corresponds to the region/representative-point determination unit 51 shown in FIG. 6, and the coordinate setting table 52, the correction gain setting table 56, and the selectors 53 and 57 are not shown in FIG. 10. The correction amount calculator 330 corresponds to the interpolation value calculator 54 and the correction amount calculator 55. The saturation/hue correction unit 340 corresponds to the adders 58 and 59. The remaining elements, namely, the chromatic difference-to-saturation/hue (Cr/Cb to T/H) converter 310 and the saturation/hue-to-chromatic difference (T/H to Cr/Cb) converter 350, are additionally provided to conduct data conversion between rectangular coordinates and polar coordinates.

In "saturation/hue (T/H)", the symbol "T" denotes the amplitude (magnitude) of an input signal represented in polar coordinates, that is, saturation, and the symbol "H" denotes the angle from a reference coordinate axis in polar coordinates, that is, hue.

To interpolate and correct a chromatic difference signal in polar coordinates, it is necessary to convert the coordinates of an input chromatic difference signal P.

In the chromatic difference-to-saturation/hue (Cr/Cb to T/H) converter 310 shown in FIG. 10, the input chromatic difference signal P is represented in rectangular coordinates (Cr, Cb). This chromatic difference signal (Cr, Cb) is converted into polar coordinates by the chromatic difference-to-saturation/hue (Cr/Cb to T/H) converter 310.

The conversion is expressed as:

$$\text{angle } H=\arctan(Cr/Cb)$$

$$\text{amplitude } T=\sqrt{(Cr^2+Cb^2)}$$

$$Cr=T*\sin(H), Cb=\cos(H) \qquad (10)$$

When the rectangular coordinates P(X, Y)=(Cb, Cr) are known, Cr and Cb can be computed using equations (10). The T and H values computed by calculating equations (10) are output to the region/representative-point determination unit 320.

When the chromatic difference signal P represented in polar coordinates is input to the region/representative-point determination unit 320 (51), a region in polar coordinates is determined, and two representative points sandwiching the coordinate point P of the input chromatic difference signal P are obtained.

The case of twelve representative points is shown in FIG. 8 and in Table 1. In Table 1, twelve representative points are set such that, with regard to a polar coordinate representation (amplitude and phase (angle)), P1(BMg) is P(114.40, 22.27), P2(Mg) is P2(136.16, 51.69), . . . and P12(B) is P12(129.16, 350.80). The number of representative points can be other than twelve, and the coordinate values thereof are not limited to the aforementioned values. The larger the number of representative points, the higher the precision. However, the larger the number of representative points, the longer it takes to perform operations to obtain the representative points (the processing time becomes longer). Thus, it is necessary to set the number of representative points with the processing time in mind.

The polar coordinates P(T, H) of the input chromatic difference signal P are computed using equations (10). On the basis of the angle H of the chromatic difference signal P(T, H), two representative points sandwiching the input chromatic difference signal P are determined. Assume P1 and P2 are the two representative points sandwiching the chromatic difference signal P, and P1 and P2 serve as reference points. In addition, on the basis of the coordinate axis Cb, assume P1(T1, H1) are the coordinates of the chromatic difference signal P1, P2(T2, H2) are the coordinates of the chromatic difference signal P2, and the angle condition is H1<H<H2 (see FIG. 8).

Figure 11:
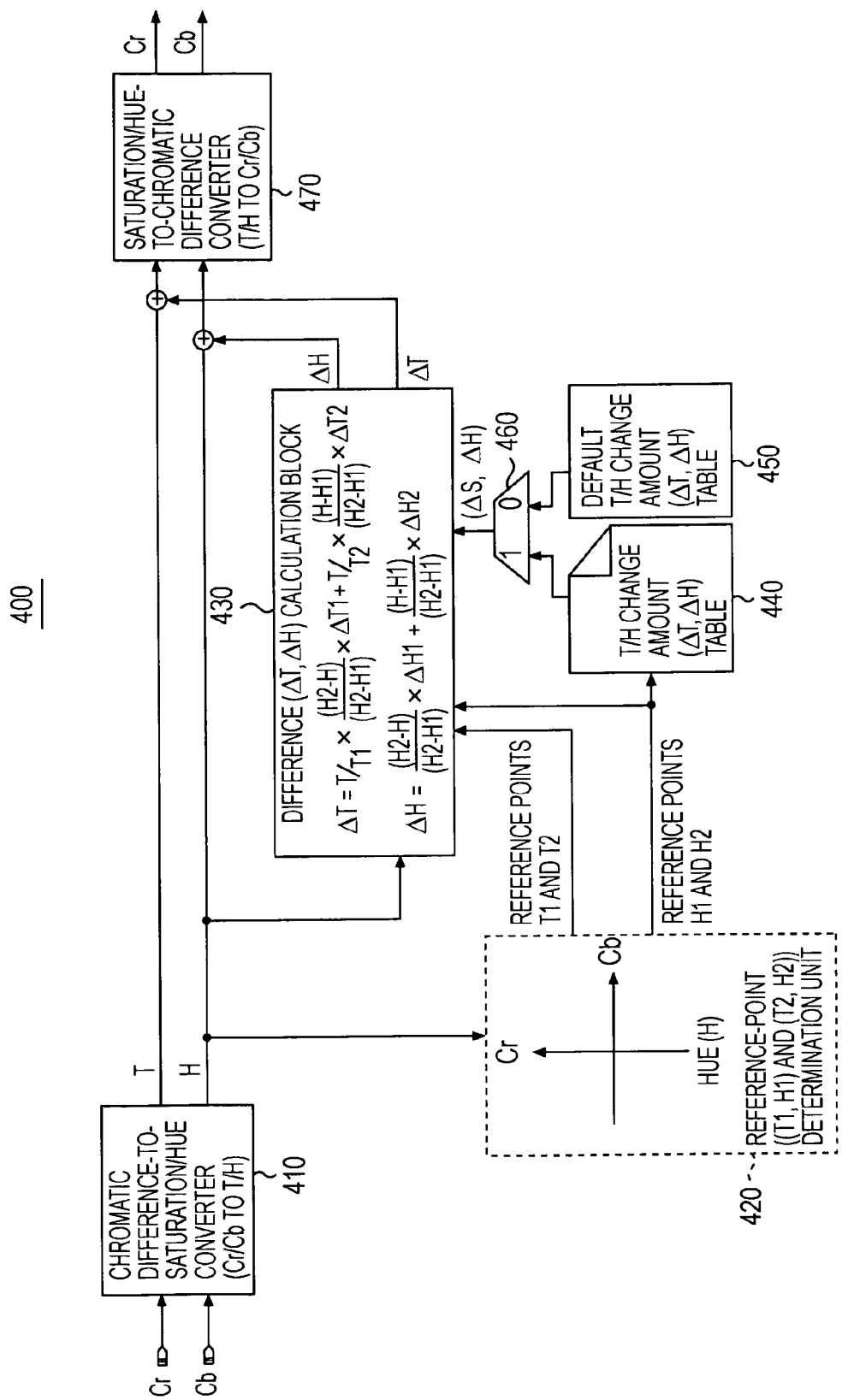
FIG. 11 is a block diagram for describing the operation of the saturation/hue adjuster shown in FIG. 10.

The principle of the correction amount calculator 330 in the polar coordinate representation is shown in a difference ($\Delta T$, $\Delta H$) calculation block 430 shown in FIG. 11. Assume ($\Delta T$, $\Delta H$) represents a difference of the input chromatic difference signal P at the coordinates P(T, H), ($\Delta T1$, $\Delta H1$) represents a difference of the chromatic difference signal P1 closest to the input chromatic difference signal P, and ($\Delta T2$, $\Delta H2$) represents a difference of the chromatic difference signal P2. Then, the difference of the chromatic difference signal P is computed by performing linear interpolation using angles:

$$\Delta T = K3 * \{(H2-H)/(H2-H1)\} * \Delta T1 + K4 * \{(H-H1)/(H2-H1)\} * \Delta T2$$

$$\Delta H = \{(H2-H)/(H2-H1)\} * \Delta H1 + \{(H-H1)/(H2-H1)\} * \Delta H2 \quad (11)$$

where K3=T/T1 and K4=T/T2.

Assume P1 and P2 are two representative points that are closest to the chromatic difference signal P, and the coordinates of the two points P1 and P2 are, for example, P1(BMg)=(114.40, 22.27) and P2(Mg)=(136.16, 51.69). When these two representative points P1 and P2 are determined, correction data ($\Delta T1$, $\Delta H1$) and ($\Delta T2$, $\Delta H2$) of the representative points P1 and P2 are set as known data in a table (not shown).

In the saturation/hue correction unit 340 (corresponding to the adders 58 and 59), a corrected value of the chromatic difference signal P(T, H) can be obtained by adding ($\Delta T$, $\Delta H$) computed using equations (11) to the polar coordinates P(T, H). That is, the coordinates of the corrected chromatic difference signal are obtained as (T+$\Delta T$, H+$\Delta H$).

In the saturation/hue-to-chromatic difference (T/H to Cr/Cb) converter 350, the corrected chromatic difference signal is converted from polar coordinates (T, H) to rectangular coordinates (Cr, Cb) and output as rectangular coordinate data. The rectangular coordinates (Cr, Cb) in equations (10) can be obtained by performing arithmetic operations using software or hardware.

With reference to FIGS. 10 and 11, the operation of the saturation/hue adjustment block 300 (400) in the polar coordinate representation will be described.

When the components Cr (R-Y) and Cb (B-Y) of the chromatic difference signal P are input to the chromatic difference-to-saturation/hue (Cr/Cb to T/H) converter 310 (410), the rectangular coordinates (Cr, Cb) of the input chromatic difference signal P are converted into polar coordinates. This coordinate conversion is performed using equations (10), thereby computing the polar coordinates P(T, H). The converted chromatic difference signal data represented in polar coordinates is output to a reference-point ((T1, T2) and (T2, H2)) determination unit 420 (region/representative-point determination unit 320).

The reference points P1 and P2 are determined using, for example, hue (H). An exemplary determination method will be described below.

When the coordinates (T, H) of the input chromatic difference signal P are input to the reference-point ((T1, T2) and (T2, H2)) determination unit 420, region determination is performed. On the basis of the coordinate point P(T, H) of the input chromatic difference signal P, a representative point whose angle is closest and less than or equal to the angle of the coordinate point P(T, H) and a representative point whose angle is closest to and greater than the angle of the coordinate point P(T, H) are determined from among the twelve representative points on the Cb/Cr plane chart shown in FIG. 8. That is, two representative points that sandwich the angle H and that are closest to the angle H are determined. In the algorithm 400 shown in FIG. 11, these operations are performed by the reference-point ((T1, T2) and (T2, H2)) determination unit 420.

An exemplary method of determining the reference points will be described. Assume the coordinates of the input chromatic difference signal P are P(T, H)=P(110, 30.336). Then, the detection direction, i.e., a clockwise or counterclockwise direction, is determined on the basis of the sign (positive or negative) of the coordinate. Since the sign of the angle H is positive, the representative points are detected in a counterclockwise direction.

At first, the angle H=33.366 of the chromatic difference signal P is compared with the angle H1=22.7 of the representative point P1(BMg), and it is determined that the angle H1 of P1(BMg) is less than the angle H of the chromatic difference signal P. Next, the angle H of the chromatic difference signal P is compared with the angle H2=51.69 of the representative point P2(Mg), and it is determined that the angle H2 is greater than the angle H. When it is determined that the angle H2 is greater than the angle H and that P2(Mg) is the first chromatic difference signal in which the sign of angle difference obtained by comparison changes, the comparison operation from this point onward is stopped. As a result, chromatic difference signals sandwiching the angle H are determined as chromatic difference signals corresponding to the angle H1=22.27 and the angle H2=51.69. Although a simple example is shown here, similar angle comparisons shall be made to determine the representative points.

As a result, the coordinates of the representative points (reference points) relative to the chromatic difference signal P are (T1, H1)=(114.40, 22.27) and (T2, H2)=(136.16, 51.69).

In the above case, the sign of the angle of the input chromatic difference signal in the Cr/Cb coordinate system is determined, and then the detection direction (clockwise or counterclockwise) is determined. Otherwise, comparisons are regularly and sequentially made with the representative points, and the processing time in the case of negative angles (representative points having an angle of 180 degrees or greater) becomes longer. For example, when the chromatic difference signal P resides in the fourth quadrant, there are P1, P2, ..., P10, P11, and P12 for the X coordinate point of the input chromatic difference signal P. When the input chromatic difference signal P is sequentially compared with P1, P2, ... and P12, it takes a long processing time. In other words, when the sign of the input chromatic difference signal P is detected and the detection direction is determined according to the sign, the processing becomes faster and the processing time becomes shorter.

Besides the aforementioned method, various other methods of obtaining the representative points are available, and the present invention is not limited thereto.

When the two representative points are determined by the region/representative-point determination unit 320, the correction amount calculator 330 calculates equations (11) in the same polar coordinate system. Referring to FIG. 11, the difference (ΔT, ΔH) calculation block 430 in the algorithm 400 performs arithmetic operations using polar coordinate data of the two reference points P1 and P2 sandwiching the input chromatic difference signal P.

For the reference points P1(T1, H1) and P2(T2, H2) of the chromatic difference signals, a reference is made to a T/H change amount (ΔT, ΔH) table 440. That is, a change amount (correction amount) in the amplitude direction and a change amount (correction amount) in the angle direction at the polar coordinate points P1(T1, H1) and P2(T2, H2) are searched for in preset data in the T/H change amount (ΔT, ΔH) table 440. Assume the obtained change amounts (correction amounts) are (ΔT1, ΔH1) and (ΔT2, ΔH2).

In contrast, default values (0, 0) are set to all the reference points in a default T/H change amount (ΔT, ΔH) table 450 shown in FIG. 11.

Output data from the default T/H change amount (ΔT, ΔH) table 450 and output data from the T/H change amount (ΔT, ΔH) table 440 are supplied to a selector 460. By switching the selector 460 using a control signal, one of the data is output to the difference (ΔT, ΔH) calculation block 430.

At the same time, the reference-point ((T1, T2) and (T2, H2)) determination unit 420 supplies the amplitude T1 at the reference point P1 and the amplitude T2 at the reference point P2 to the difference (ΔT, ΔH) calculation block 430.

Assume the correction amounts at the reference points P1 and P2 are (ΔT1, ΔH1)=(10, −2.0) and (ΔT2, ΔH2)=(15, 2.0). Since K3=T/T1=0.9615 and K4=T/T2=0.8079, the correction amount (ΔT, ΔH) is computed using equations (11):

$$\Delta T = 10.3024$$

$$\Delta H = -0.89925 \text{ (degrees)} = -0.015694 \text{ (radian)}$$

Since the polar coordinates P(T, H) of the corrected chromatic difference signal P can be computed by adding the correction amount (ΔT, ΔH) to the input chromatic difference signal P, P(T, H)=(x+ΔT, y+ΔH)=(120.3041, 29.4676).

The corrected chromatic difference signal P is input to the saturation/hue-to-chromatic difference (T/H to Cr/Cb) converter 350 connected at a subsequent stage.

A saturation/hue-to-chromatic difference (T/H to Cr/Cb) converter 470 converts the corrected polar coordinate data of the chromatic difference signal into rectangular coordinates (Cr, Cb) using equations (10).

As has been described above, the saturation/hue correction algorithm in polar coordinates can correct a chromatic difference signal residing in any hue region in the coordinate system. In the saturation/hue polar coordinate system, a chromatic difference signal to be corrected is interpolated in polar coordinates using a plurality of vectors indicating representative points. When the chromatic difference signal to be corrected is interpolated and corrected using two color reference signals (representative points) adjacent to the chromatic difference signal to be corrected, the interpolation and correction operations are complicated since they involve angle calculations. However, since the correction is done by performing linear interpolation using angles, the number of arithmetic operations is small. The circuit size of hardware implementing this processing is prevented from increasing, and precise adjustment can be performed.

Figure 12:
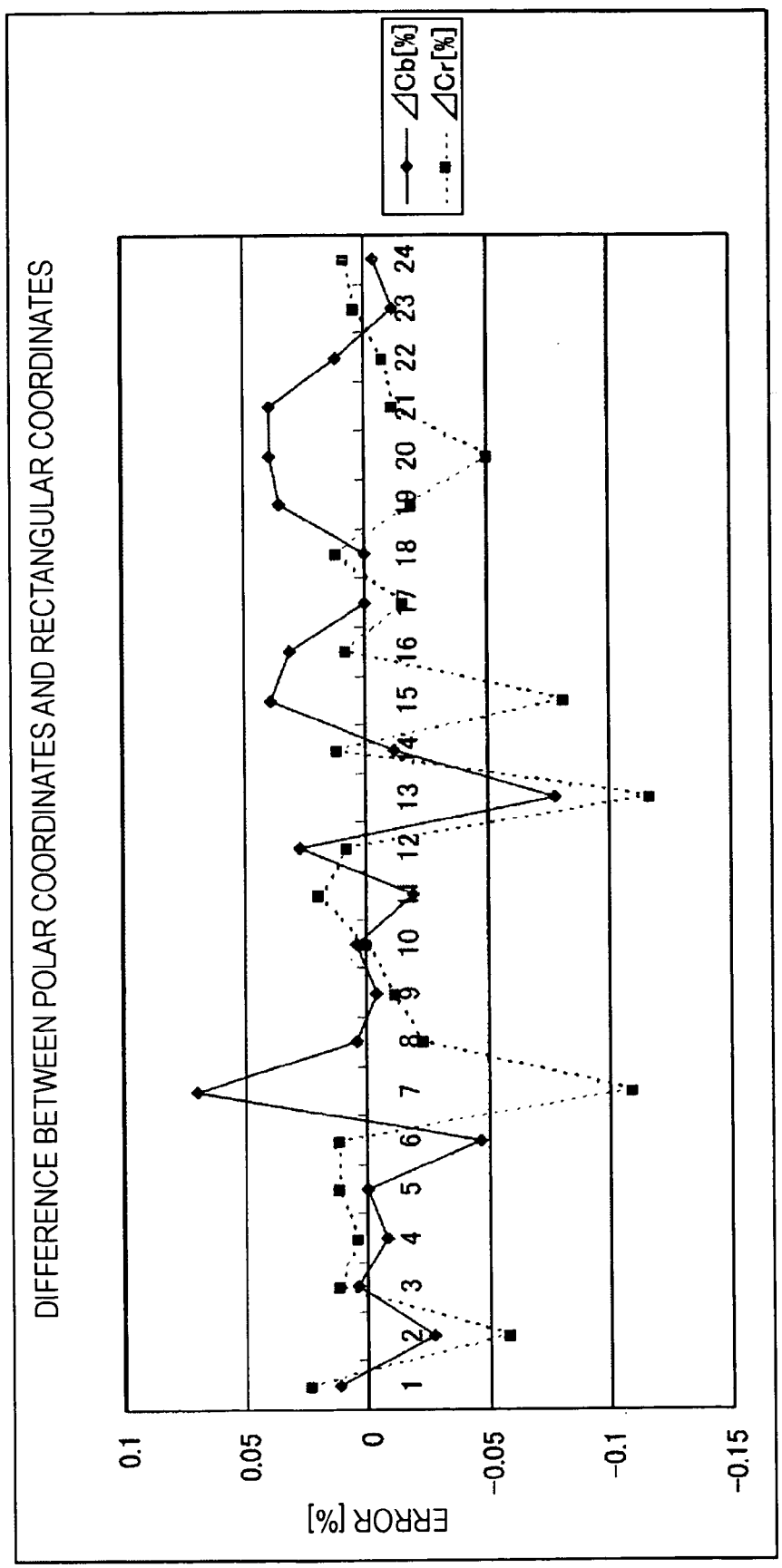
FIG. 12 is a graph showing the results of saturation/hue adjustments carried out in rectangular coordinates and in polar coordinates.

FIG. 12 is a graph showing the results of saturation/hue correction in rectangular coordinates and in polar coordinates.

The axis of abscissas of the graph represents numbers corresponding to color numbers on the Macbeth color chart, and the axis of ordinates of the graph represents errors (%) between chromatic difference signals in polar coordinates and chromatic difference signals in rectangular coordinates.

The color numbers of representative points (reference points) in rectangular coordinates are the same as the color numbers of representative points (reference points) in polar coordinates, and correction amounts thereof are set to equal amounts in rectangular coordinates and in polar coordinates. In this state, errors are computed.

As a result, it is confirmed that the saturation/hue adjustment errors between rectangular coordinates and polar coordinates of any color numbers 1 to 24 on the Macbeth chart are contained within 0.15% or less, which means that satisfactory results are achieved.

Figure 13:
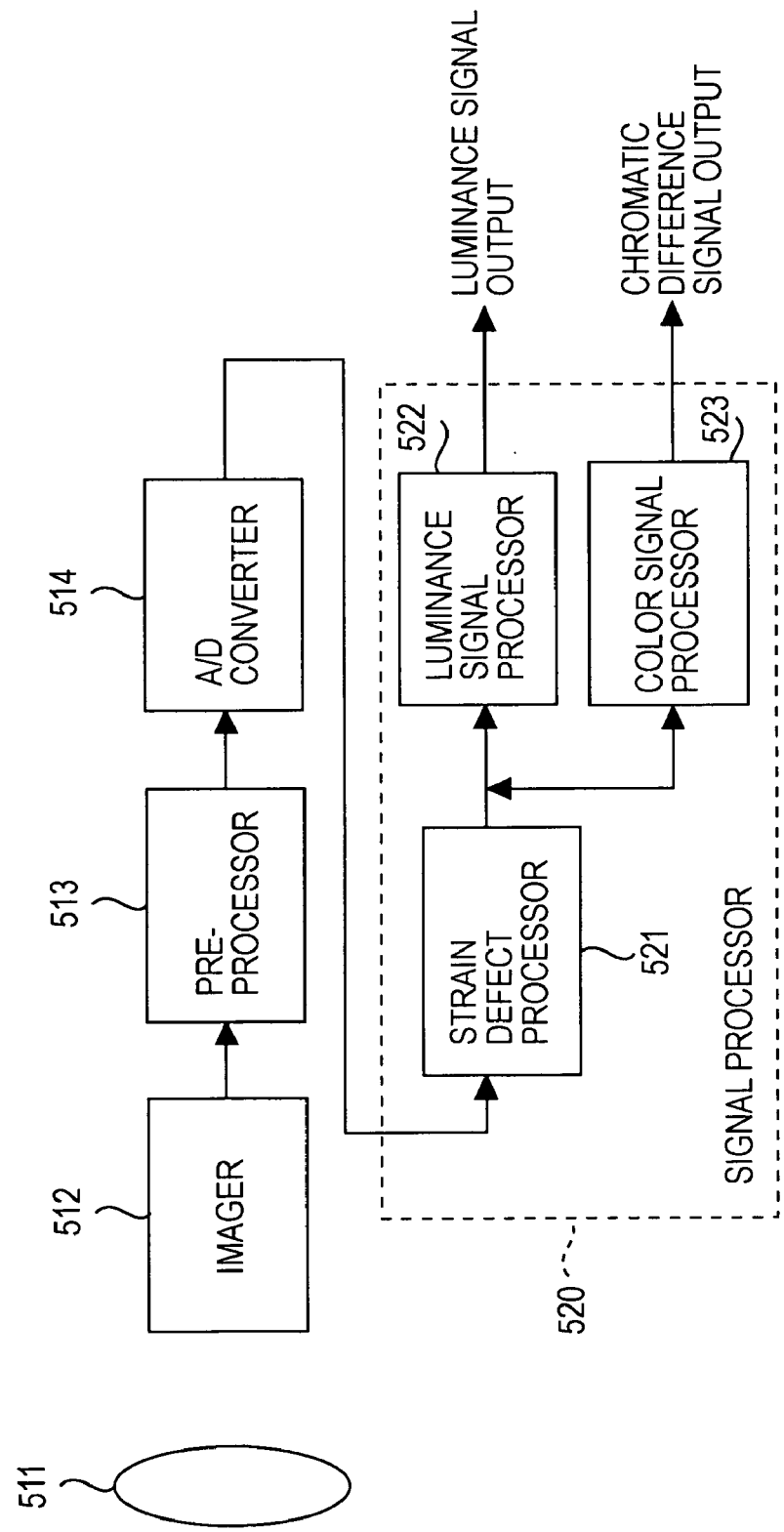
FIG. 13 is a block diagram of a camera system.

FIG. 13 shows the structure of a camera system 500 according to another embodiment of the present invention.

The camera system 500 shown in FIG. 13 includes, for example, a lens 511, an imager 512, a pre-processor 513 including a correlation double sampling (CDS) circuit and a preamplifier, an analog-to-digital (AD) converter 514, and a signal processor 520 including a strain defect processor 521, a luminance signal processor 522, and a color signal processor 523.

The lens 511 projects an image of an object on an imaging surface of the imager 512. The imager 512 includes, for example, a charge-coupled device (CCD) or complementary metal-oxide semiconductor (CMOS) device and converts the image transmitted through the lens 511 into an electrical signal serving as an image signal, which is then passed to the pre-processor 513 including the CDS circuit and the preamplifier.

The pre-processor 513 samples and holds the image signal from the imager 512 and extracts necessary data. At the same time, the pre-processor 513 applies automatic gain control (AGC) to the image signal to adjust the level thereof to an appropriate level and additionally applies black level adjustment to the image signal. An output signal from the pre-processor 513 is input to the AD converter 514 connected at a subsequent stage.

Since the AD converter 514 processes pixel (image) signals, the AD converter 514 has a precision of 10 to 12 bits. The AD converter 514 converts the output signal (analog signal) supplied from the pre-processor 513 into a digital signal and outputs the digital signal to the signal processor 520 connected at a subsequent stage.

The signal processor 520 includes the strain defect processor 521, the luminance signal processor 522, and the color signal processor 523 and performs digital signal processing. In the following description, a digital signal processed by each processor will be referred simply as "data".

The strain defect processor 521 applies black detection and digital gain control to the image signal and corrects shading induced by the lens 511. In addition, the strain defect processor 521 separates the image signal into a luminance signal (data) from a color signal (data) using delay lines and corrects a pixel defect using delay lines.

The luminance signal processor 522 performs various signal processing operations such as correction of the horizontal/vertical (direction) contours of the Y (luminance) signal, mixing (addition) of the veridical/horizontal-contour-corrected signals, gamma correction, luminance key processing, solarization of part of the image to be altered to an arbitrary luminance, and negative processing or color inversion of the image.

The color signal processor 523 performs color separation, clamping, removal of noise and false color signals in the color signal, RGB matrix processing, white balance (WB) adjustment in which coefficients of the R, G, and B colors are changed, gamma correction, R-G/B-G conversion, suppression of false color signals, generation of chromatic difference signal components (Cr/Cb), chromatic suppression, and hue/gain adjustment.

Figure 14:
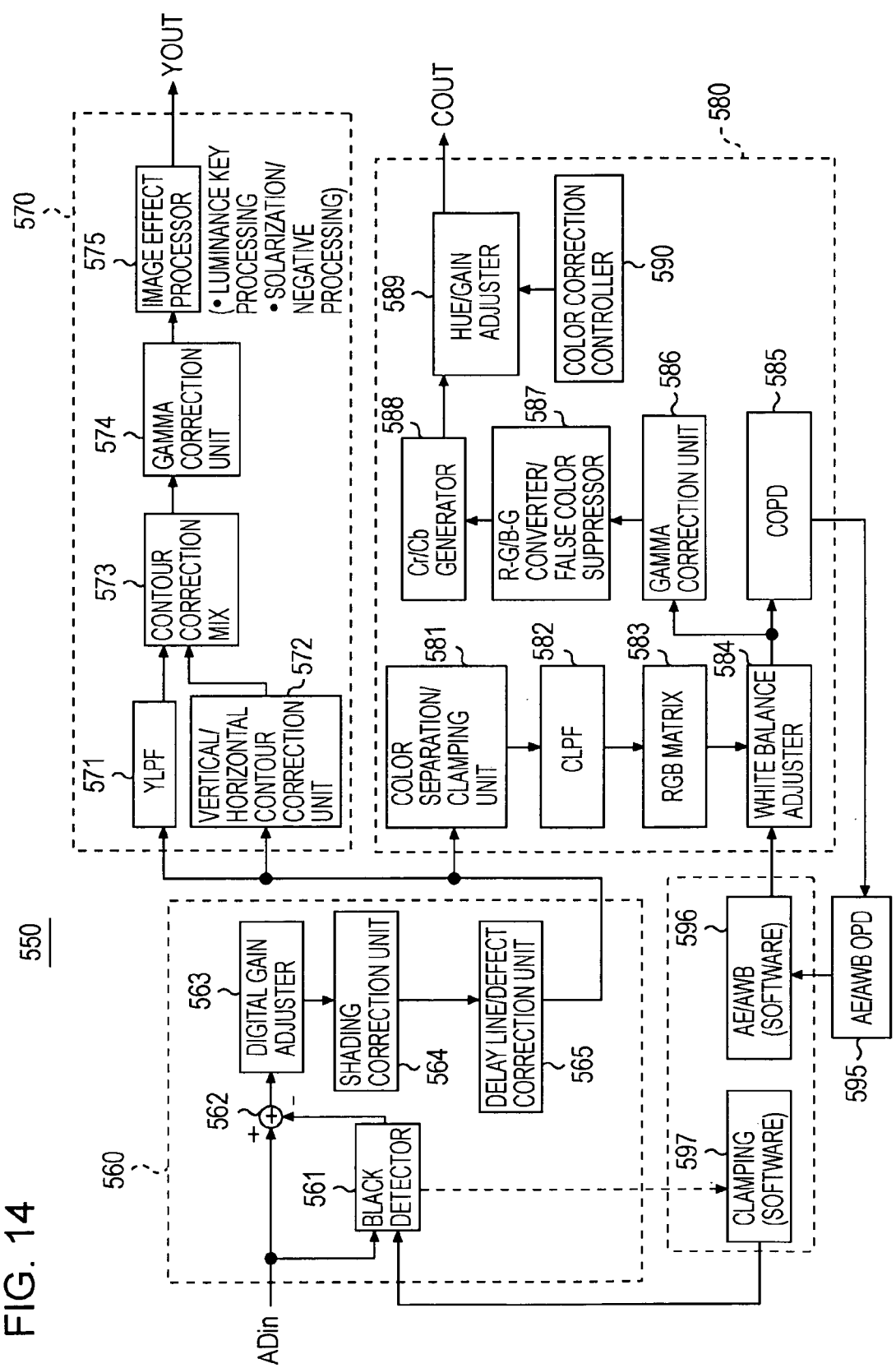
FIG. 14 is a block diagram of a signal processor.

FIG. 14 is a block diagram of the more detailed structure of a signal processor 550 (520) according to the embodiment of the present invention.

The signal processor 550 includes three blocks, namely, a pre-processor 560, a Y-block (luminance signal processor) 570, and a C-block (color signal processor) 580.

The pre-processor 560 includes a black detector 561, an adder 562, a digital gain adjuster 563, a shading correction unit 564, and a delay line/defect correction unit 565.

Using data (ADin) output from the AD converter 514, the black detector 561 computes the black level of the input data (signal) and outputs data for computing the clamping level.

The adder 562 subtracts the black level from the input data (ADin) and additionally generates new pixel data based on the black level (clamped to the black level).

The digital gain adjuster 563 digitally changes the gain of the data clamped to the black level, which is output from the adder 562, to adjust the brightness.

Depending on the aperture of the lens 511, the luminance of a peripheral portion of the image differs from the luminance of a central portion of the image. The shading correction unit 564 corrects this luminance difference.

Using delay lines and arithmetic units (adder and subtractor), the delay line/defect correction unit 565 separates the input data into a luminance signal (data) and a color signal (data). In addition, the delay line/defect correction unit 565 applies delay to the input data using a delay element, adds the delayed pixel values using the adder to compute the average of pieces of data before and after a defect pixel, and replaces the defect pixel with the average, thereby correcting the defect pixel.

In such a manner, the input data is corrected for defects by the delay line/defect correction unit 565, and the separated pieces of data, namely, the luminance signal and the color signal, are supplied to the luminance signal processor (Y-block) 570 and the color signal processor (C-block) 580, respectively.

The luminance signal processor (Y-block) 570 includes a luminance signal low pass filter (YLPF) 571, a vertical/horizontal contour correction unit 572, a contour correction/addition unit (contour correction mix) 573, a gamma correction unit 574, and an image effect processor 575.

The YLPF 571 performs add operations of data regarding the luminance signal and equivalently removes noise.

Using delay elements and arithmetic units for performing add and subtract operations, the vertical/horizontal contour correction unit 572 generates a pulse for emphasizing the horizontal contour of the image and a pulse for emphasizing the vertical contour of the image.

The pulse for correcting the horizontal contour and the pulse for correcting the vertical contour, which are output from the vertical/horizontal contour correction unit 572, and the luminance data supplied from the YLPF 571 are supplied to the contour correction/addition unit (contour correction mix) 573, which in turn adds the supplied pulses and data to output contour-emphasized luminance data.

If a display is, for example, a cathode ray tube (CRT) display and the gamma characteristic thereof is 2.2, the gamma correction unit 574 applies correction in advance to the input/output characteristic curve (on the imager side) such that $1/\gamma=0.45$ so that the image gradation can be represented accurately on the CRT, thereby achieving an accurate reproduced image.

The image effect processor 575 performs luminance key processing, solarization of part of the image to be altered to an arbitrary luminance, and negative processing or color inversion of the image.

Next, the color signal processor (C-block) 580 will be described.

The color data processed by the delay line/defect correction unit 565 is input to the color signal processor (C-block) 580. The color signal processor (C-block) 580 includes a color separation/claming unit 581, a chromatic signal low pass filter (CLPF) 582, an RGB matrix 583, a white balance (WB) adjuster 584, a color signal optical detector (COPD) 585, a gamma correction unit 586, an R-G/B-G converter/false color suppressor 587, a Cr/Cb generator 588, a hue/gain adjuster (monotone effect processor) 589, and a color correction controller 590.

The image signal (data) output from the delay line/defect correction unit 565 is supplied to the color separation/claming unit 581, and the image signal (data) is separated into colors and clamped to a predetermined value.

The CLPF 582 is, for example, a digital LPF and removes false color signals and noise in the color-separated signals.

The RGB matrix 583 performs arithmetic operations of output data from the CLPF 582 to compute pieces of color data for the three primary color R, G, and B and outputs the generated data to the white balance adjuster 584.

The white balance adjuster 584 multiplies predetermined coefficients to the R, G, and B color signals (data) to set white exhibiting a target color temperature. The color data with the correct white balance is output to the gamma correction unit 586 and the COPD 585.

The COPD 585 detects the pieces of color data for the three primary colors R, G, and B, which are integrated by an auto-exposure/auto white balance optical detector (AW/AWB OPD) 595 for a period of, for example, one field or one frame.

AW/AWB software 596 performs software processing operations to compute color temperatures in a color temperature coordinate system from the integrated pieces of color data and to obtain correction coefficients of the pieces of color data relative to the target color temperature. These correction coefficients are routed as feedback to the white balance adjuster 584 to adjust the white balance.

The R-G/B-G converter/false color suppressor 587 applies gamma correction to the color data output from the white balance adjuster 584, suppresses false color signals generated by contamination with other color signals in the pixels of the imager 512, and converts the data into an R-G color signal and a B-G color signal.

The Cr/Cb generator 588 generates chromatic difference signals R-Y and B-Y where Cr is R-Y and Cb is B-Y (Y is a luminance signal).

The hue/gain adjuster 589 adjusts the hue and gain of the chromatic difference signals using a control signal from the color correction controller 590.

The processed (color) data is output to an encoder (not shown) and is encoded using the luminance (Y) signal output from the luminance signal processor (Y-block) 570, thereby generating component or composite image data.

The operation of the signal processor 550 shown in FIG. 14 will be described.

The pixel analog signal output from the pre-processor 513 is converted by the AD converter 514 into digital data (signal) with a precision of 10 to 12 bits, and the converted data is input to the pre-processor 560 of the signal processor 550. The input data (ADin) is input to the black detector 561 and one of two input terminals of the adder 562. The black detector 561 computes the black level and supplies the computed data to clamping software 597, which in turn computes the clamping level by software processing. The clamping data output from the clamping software 597 is supplied to the black detector 561, and the black detector 561 outputs data clamped to the black level to the adder 562.

The data clamped to the black level is subtracted from the data (ADin) input to the adder 562, and the difference (pixel data) is output to the digital gain adjuster 563, which in turn changes the gain thereof to adjust the brightness.

The gain-adjusted pixel data is supplied to the shading correction unit 564, which in turn corrects a luminance difference due to the lens 511 provided at the front of the imager 512 of the camera system 500. Thereafter, the delay line/defect correction unit 565 corrects a pixel defect and separates the data into color data and luminance data.

Regarding the separated color data and luminance data, the luminance data is supplied to the luminance signal processor (Y-block) 570, and the color data is supplied to the color signal processor (C-block) 580.

The luminance signal input to the YLPF 571 is extracted by an LPF (not shown), thereby cutting off out-of-band signals and noise.

The luminance signal (data) and the contour-emphasized data output from the vertical/horizontal contour correction unit 572 are supplied to the contour correction/addition unit 573, which in turn adds the two pieces of data and then applies gamma correction to the mixed data.

Thereafter, image effect processing such as luminance key processing, solarization, negative processing or the like is performed, and the image-effect-processed signal is derived from an output terminal (YOUT).

In contrast, the color data separated by the color separation/claming unit 581 is supplied to the CLPF 582, which in turn removes frequency components higher than the color signal, thereby removing noise and false color signals.

The color data from which noise and false color signals are removed is supplied to the RGB matrix 583, which in turn obtains signals for the three primary colors R, G, and B. These signals are routed to the white balance adjuster 584, which in turn adjusts the white balance. Then, the gamma correction unit 586 applies gamma correction to the color signals. The data output from the white balance adjuster 584 is supplied to the COPD 585 and the AE/AWB OPD 595, and pieces of color data are detected using hardware.

The detected pieces of color data are supplied to the AW/AWB software 596, which in turn computes color temperatures of the color signals (data) by performing software processing using a computer or a processor. In addition, the AW/AWB software 596 computes correction coefficients of the colors relative to a target (white) color temperature and supplies the computed coefficient data as feedback to the white balance adjuster 584, thereby automatically adjusting the white balance.

The gamma-corrected color data is supplied to the R-G/B-G converter/false color suppressor 587, which in turn performs R-G/B-G conversion and suppression of false color signals. Using the R-G and B-G data generated by the R-G/B-G converter/false color suppressor 587, the Cr/Cb generator 588 generates chromatic difference signal components Cr=R-Y and Cb=B-Y.

The chromatic difference signal components Cr and Cb are supplied to the hue/gain adjuster 589, which in turn applies hue/saturation adjustment to Cr and Cb, thereby altering the hue and saturation and adjusting the color signal.

In the hue/gain adjuster 589, as has been described above, the region in rectangular coordinates in which the input chromatic difference signal Cr/Cb resides is detected using phase data. After the phase detection, representative points (P1, P2) of two input signals (images) whose hue values (phases) are closest to the input chromatic difference signal (data) are determined. On the basis of the coordinate values of these two reference points and the input chromatic difference signal values, the areas S1, S2, and S3 of the triangles are computed using equations (3) to (5). Differences at, for example, the reference points P1 and P2 and the areas S1, S2, and S3 are substituted into equations (7) to compute the correction amount ($\Delta x$, $\Delta y$), and the computed correction amount ($\Delta x$, $\Delta y$) is added to the original input chromatic difference signal components, thereby outputting Cr and Cb signals.

Besides the arithmetic operations in rectangular coordinates, as has been described above, interpolation and correction can be performed in polar coordinates. In interpolation in polar coordinates, since an input chromatic difference signal is represented in rectangular coordinates, a rectangular to polar conversion of the input chromatic difference signal is conducted.

For any input chromatic difference signal, two points that are closest to the input chromatic difference signal and that sandwich the input chromatic difference signal are detected and used as representative points. On the basis of the representative points serving as reference points, correction amounts are substituted into equations (11), thereby computing the correction amount ($\Delta T$, $\Delta H$) of the chromatic difference signal. The computed correction amount is added to the original chromatic difference signal, thereby converting the chromatic difference signal represented in polar coordinates into rectangular coordinates to be output. As a result, color correction (adjustment) can be performed.

The chromatic difference signal (data) output from the hue/gain adjuster 589 is output (COUT). Along with the luminance signal output (YOUT) from the luminance signal processor (Y-block) 570, the chromatic difference signal (data) is supplied to an encoder (not shown), thereby generating component or composite image data.

Provided that there are no arithmetic errors, there is almost no difference between the result of interpolation and correction of the input chromatic difference signal represented in the rectangular coordinate system and the result of interpolation and correction of the input chromatic difference signal represented in the polar coordinate system in color space. When the results are checked on a test screen on a display, there is no difference between the two results.

Although interpolation and correction in color space has been described above, the present invention is also applicable to lens characteristics represented in polar coordinates or the like. By replacing the above-described physical quantity with the vector of the curved surface of a lens, a correction amount of the curved surface of the lens can be precisely obtained, thereby improving optical characteristics.

In color interpolation and correction in rectangular coordinates, when the ratio of areas or vector products defined by an input vector and reference points is used, operations can be performed in rectangular coordinates, without performing a coordinate conversion. Thus, the circuit size is prevented from increasing.

In color correction in polar coordinates, a correction algorithm according to an embodiment of the present invention can perform adjustment only in a specific hue region, and a user can freely set correction amounts. In addition, since saturation and hue are corrected by performing linear interpolation using angles, the number of arithmetic operations is small., thereby increasing the processing speed.

It should be understood by those skilled in the art that various modifications, combinations, sub-combinations and alterations may occur depending on design requirements and other factors insofar as they are within the scope of the appended claims or the equivalents thereof.

What is claimed is:

1. A method for interpolating image signal data executed by a system under control of a microprocessor for generating an output image comprising:

interpolating a third vector sandwiched between first and second vectors on the basis of area ratios for triangles having their respective vertices located at a point of origin, an end of the third vector and an end of the first vector; the end of the third vector and an end of the second vector and a further triangle having its vertices located at the ends of each of the first, second and third vectors, the first and second vectors representing physical quantities, and further wherein a ratio of vector products determines a value of the third vector, and the third vector is used in generating output image information, and further wherein the first and second vectors are predetermined reference vectors.

2. The physical quantity interpolating method according to claim 1, wherein the coordinate data is rectangular coordinate data.

3. The physical quantity interpolating method according to claim 1, wherein the first and second vectors are provided in advance as representative points in coordinates and are selected on the basis of the third vector.

4. The physical quantity interpolating method according to claim 1, wherein a correction amount of the third vector is computed in accordance with predetermined correction amounts of the first and second vectors.

5. The physical quantity interpolating method according to claim 1, wherein a correction amount of the third vector is computed as:

$$\Delta x = (S2/S3)*\Delta x1 + (S1/S3)*\Delta x2$$

$$\Delta y = (S2/S3)*\Delta y1 + (S1/S3)*\Delta y2$$

where * represents a multiplication symbol, S1 represents an area defined by the first and third vectors, S2 represents an area defined by the second and third vectors, S3 represents an area defined by the first and second vectors, ($\Delta x1$, $\Delta y1$) represents a correction amount of the first vector, ($\Delta x2$, $\Delta y2$) represents a correction amount of the second vector, ($\Delta x$, $\Delta y$) represents the correction amount of the third vector, and (x, y) represents rectangular coordinates of the third vector.

6. The physical quantity interpolating method according to claim 1, wherein the physical quantities are chromatic difference signals.

7. A color image signal processing circuit for generating an output image comprising:

a region/representative-point determination unit operable to select, from among representative points of color signals set in advance, at least first and second representative points sandwiching an input color signal, the first and second representative points serving as reference points;

a correction amount calculator operable to compute a correction amount for the input color signal using area ratios for triangles having their respective vertices located at a point of origin, the first representative point and a point corresponding to a value of the input color signal; the point of origin, the second representative point and the point corresponding to a value of the input color signal and a further triangle having its vertices located at the first and second representative points and the point corresponding to a value of the input color signal; and a saturation/hue correction unit operable to perform an arithmetic correction operation derived by the correction amount calculator and an uncorrected color signal and to output an operation result, and further wherein a ratio of vector products determines a value of the third vector, and further wherein the first and second vectors are predetermined reference vectors.

8. The color signal processing circuit according to claim 7, wherein the coordinates are represented as rectangular coordinates, and the vector products are areas.

9. The color signal processing circuit according to claim 7, wherein the representative points are set in advance in rectangular coordinates and are selected on the basis of the input color signal.

10. The color signal processing circuit according to claim 7, wherein the correction amounts of the representative points are stored in advance in a storage device and are organized as a table.

11. The color signal processing circuit according to claim 7, wherein the correction amount of the input color signal is computed as:

$$\Delta x = (S2/S3)*\Delta x1 + (S1/S3)*\Delta x2$$

$$\Delta y = (S2/S3)*\Delta y1 + (S1/S3)*\Delta y2$$

where * represents a multiplication symbol, S1 represents an area defined by the first vector and a vector of the input color signal, S2 represents an area defined by the second vector and the vector of the input color signal, S3 represents an area defined by the first and second vectors, ($\Delta x1$, $\Delta y1$) represents the correction amount at the first representative point, ($\Delta x2$, $\Delta y2$) represents the correction amount at the second representative point, ($\Delta x$, $\Delta y$) represents the correction amount of the vector of the input color signal, and (x, y) represents the coordinates of the vector of the input color signal.

12. A camera system for extracting a color signal from an image signal output from an imager having an arrangement of a plurality of light-receiving elements, correcting color of the color signal using a color signal processing circuit, and outputting the color-corrected color signal, wherein the color signal processing circuit includes a region/representative-point determination unit operable to select, from among representative points of color signals set in advance, at least first and second representative points sandwiching an input color signal, the first and second representative points serving as reference points;

a correction amount calculator operable to compute a correction amount for the input color signal using area ratios for triangles having their respective vertices located at a point of origin, the first representative point and a point corresponding to a value of the input color signal; the point of origin, the second representative point and the point corresponding to a value of the input color signal and a further triangle having its vertices located at the first and second representative points and the point corresponding to a value of the input color signal; and a saturation/hue correction unit operable to perform an arithmetic correction operation derived by the correction amount calculator and the uncorrected color signal and to output an operation result, and further wherein a ratio of vector products determines a third vector, and further wherein the first and second vectors are predetermined reference vectors.

13. The camera system according to claim 12, wherein the coordinates are represented as rectangular coordinates, and the vector products are areas.

14. The camera system according to claim 12, wherein the representative points are set in advance in rectangular coordinates and are selected on the basis of the input color signal.

15. The camera system according to claim 12, wherein the correction amount of the input color signal is computed as:

$$\Delta x = (S2/S3)*\Delta x1 + (S1/S3)*\Delta x2$$

$$\Delta y = (S2/S3)*\Delta y1 + (S1/S3)*\Delta y2$$

where * represents a multiplication symbol, S1 represents an area defined by the first vector and a vector of the input color signal, S3 represents an area defined by the first and second vectors, S2 represents an area defined by the second vector and the vector of the input color signal, ($\Delta x1$, $\Delta y1$) represents a correction amount at the first representative point, ($\Delta x2$, $\Delta y2$) represents a correction amount at the second representative point, ($\Delta x$, $\Delta y$) represents the correction amount of the vector of the input color signal, and (x, y) represents rectangular coordinates of the vector of the input color signal.

* * * * *